United States Patent [19]

Suau et al.

[11] 4,314,338
[45] Feb. 2, 1982

[54] METHOD OF GENERATING SUBSURFACE CHARACTERISTIC MODELS

[75] Inventors: Jean Suau, Clamart, France; William Frawley, Ridgefield, Conn.

[73] Assignee: Schlumberger Limited, New York, N.Y.

[21] Appl. No.: 19,917

[22] Filed: Mar. 12, 1979

Related U.S. Application Data

[63] Continuation of Ser. No. 178,129, Sep. 7, 1971, abandoned.

[51] Int. Cl.³ .............................................. G06F 15/20
[52] U.S. Cl. .................................... 364/422; 324/324
[58] Field of Search ............... 364/421, 422; 324/324, 324/333, 388; 73/151, 153

[56] References Cited

U.S. PATENT DOCUMENTS

| | | | |
|---|---|---|---|
| 3,166,709 | 1/1965 | Doll | 324/324 X |
| 3,405,349 | 10/1968 | Moran | 340/18 R X |
| 3,457,496 | 7/1969 | Schuster | 324/324 |
| 3,457,497 | 7/1969 | Schuster | 324/324 |
| 3,457,499 | 7/1969 | Tanguy | 324/324 |
| 3,457,500 | 7/1969 | Schuster | 324/324 |

*Primary Examiner*—Jerry Smith
*Attorney, Agent, or Firm*—Cooper, Dunham, Clark, Griffin & Moran

[57] ABSTRACT

A method of computer generating a subsurface characteristic model which is substantially consistent with readings taken in a well with a well logging device. A set of actual measurement values which represent readings taken over a given depth interval of a well is derived. An initial trial model of the subsurface characteristic under investigation is then selected. Next, a set of simulated measurement values is generated by applying the approximate response characteristic of the logging device to the discrete trial model. The simulated measurement values are compared with the actual measurement values and an error function is generated in accordance with the comparison, the error function reflecting the comparison taken over a substantial portion of the given depth interval. The model is then modified in a manner which tends to minimize the error function.

46 Claims, 21 Drawing Figures

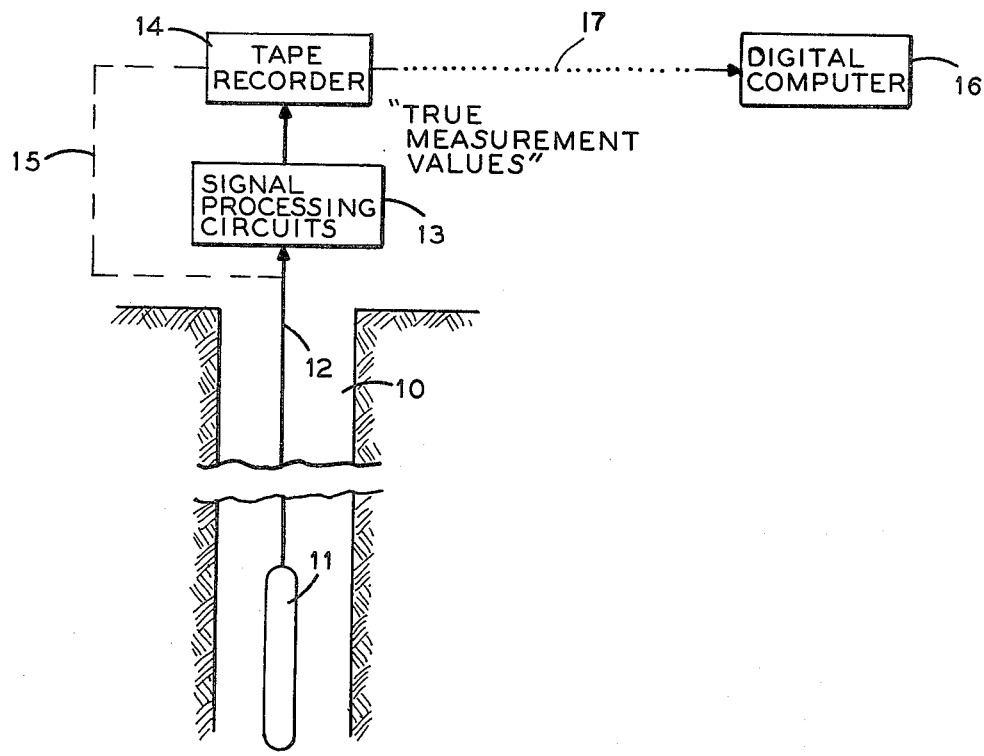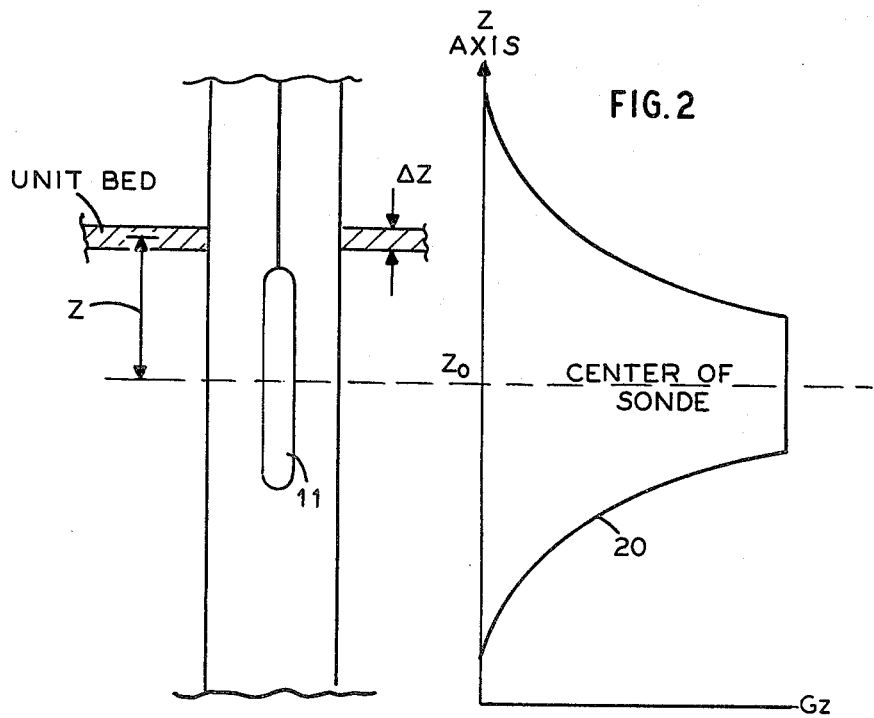

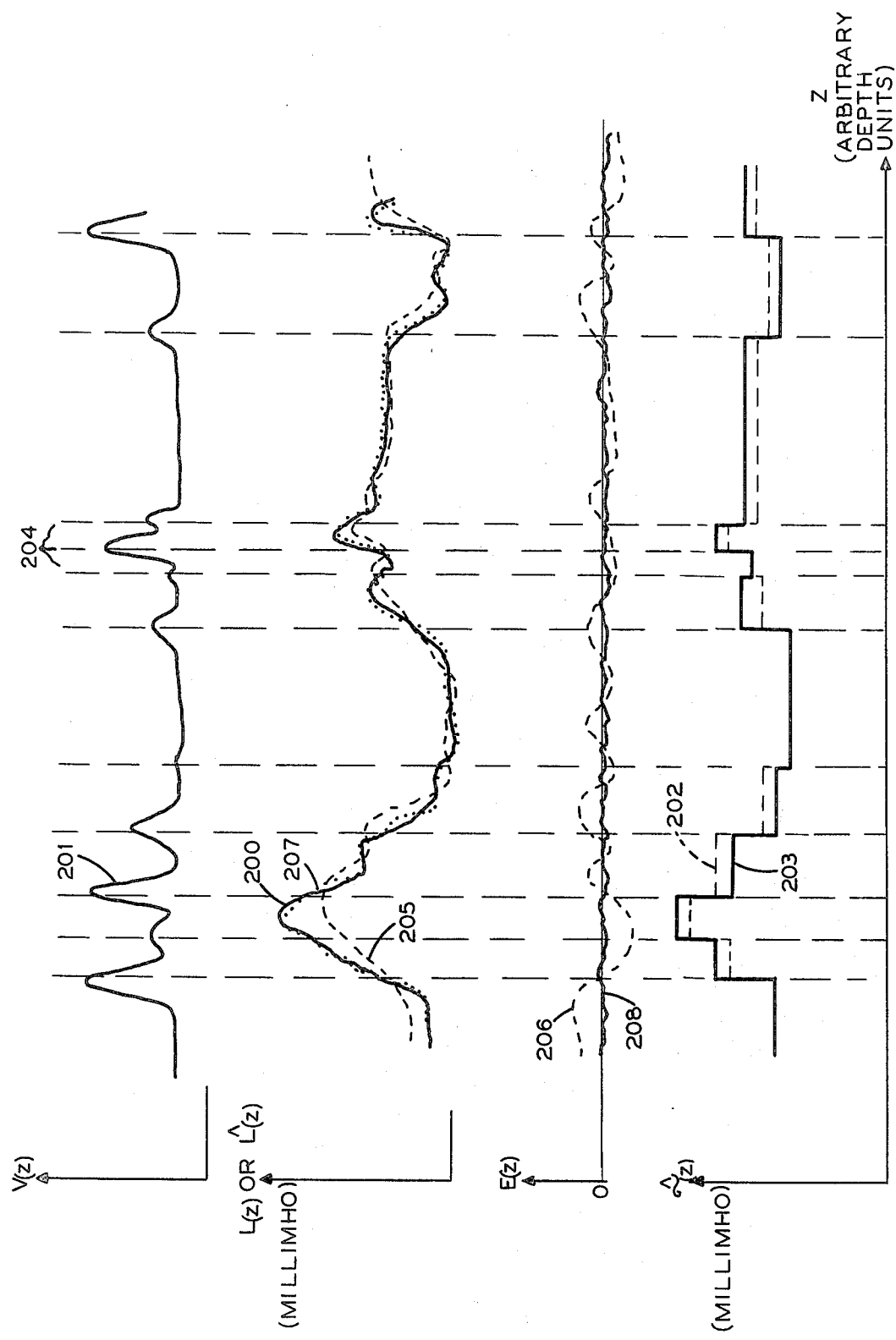

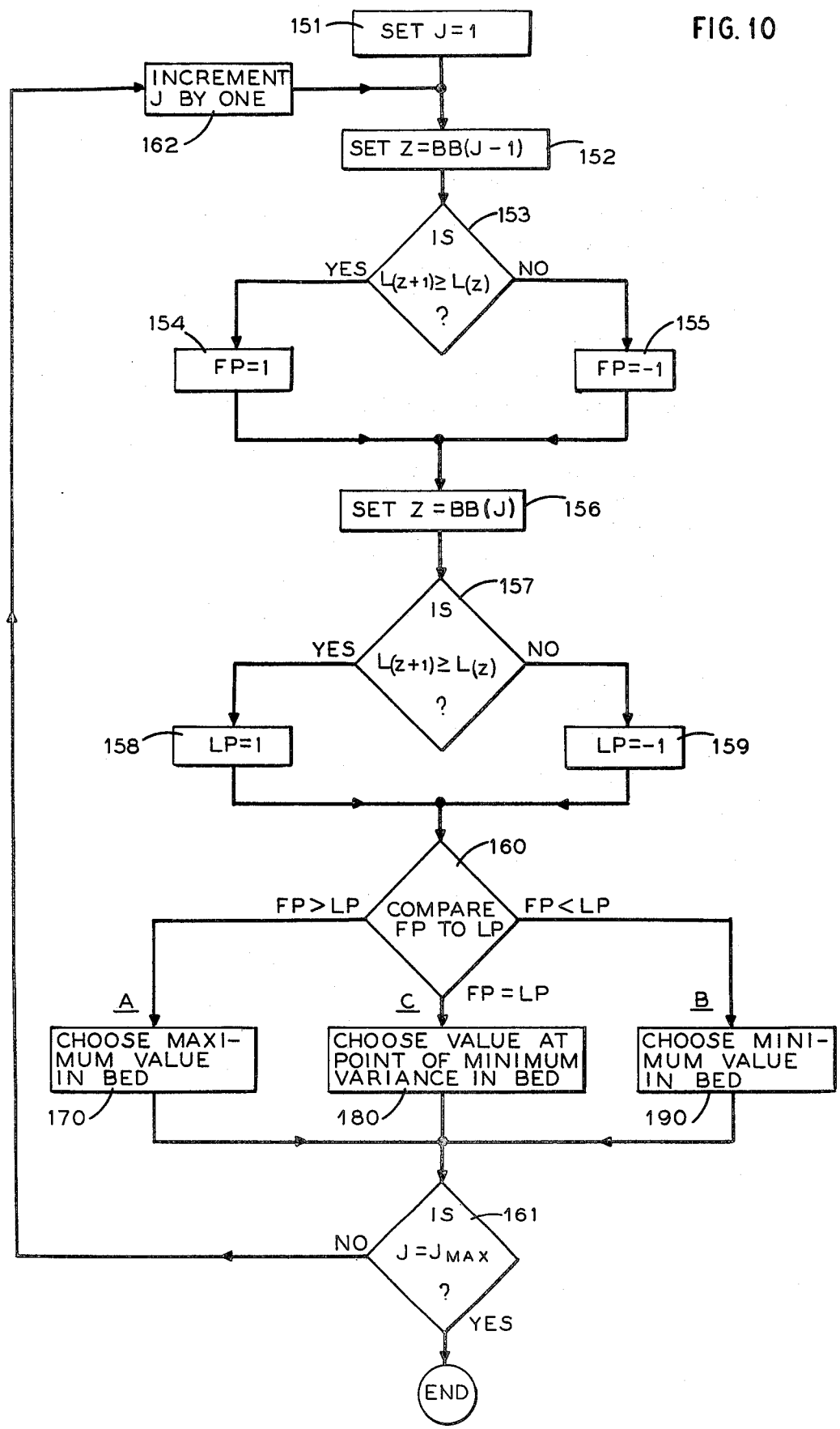

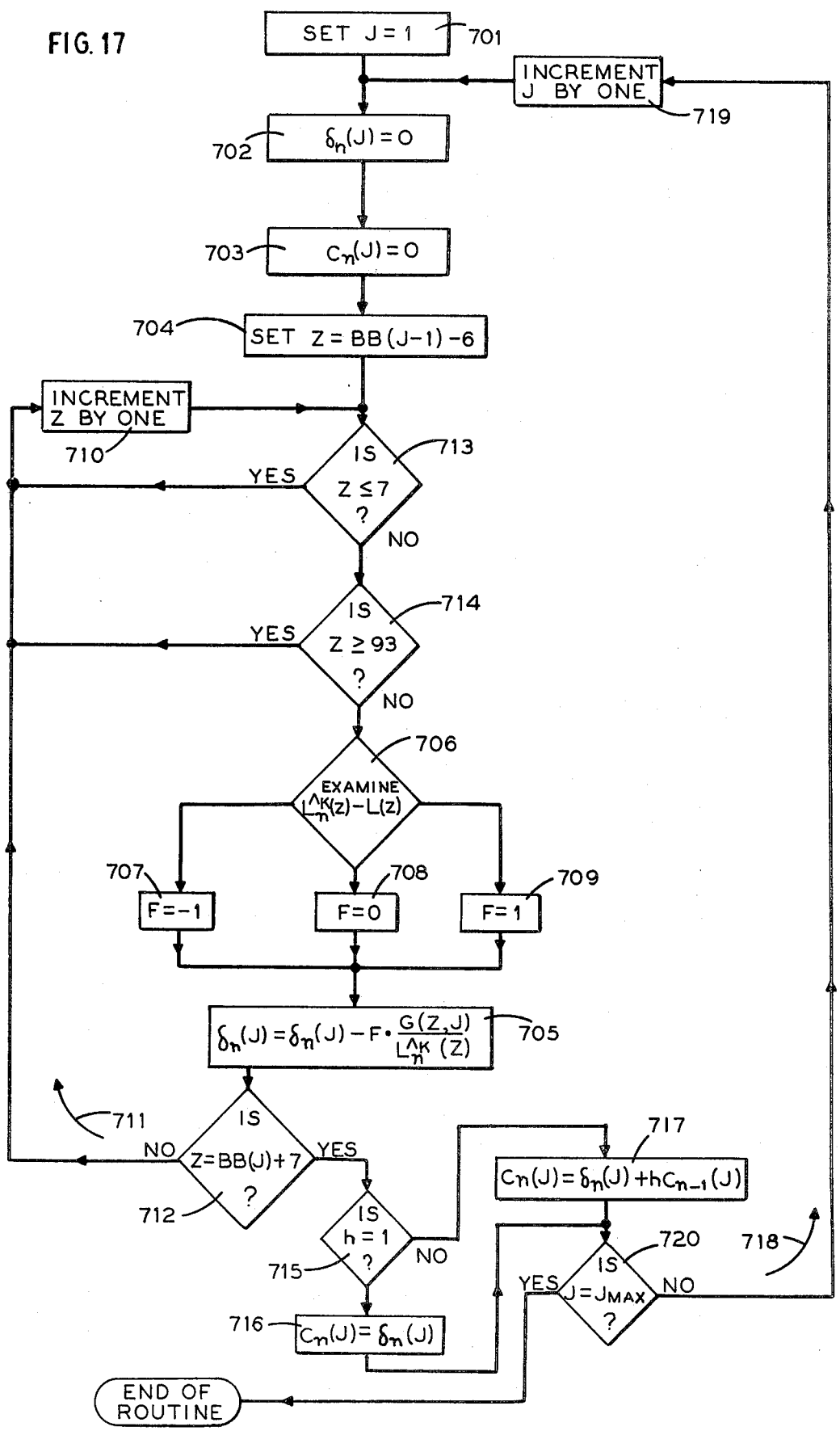

METHOD OF GENERATING SUBSURFACE CHARACTERISTIC MODELS

This is a continuation, of application Ser. No. 178,129 filed Sept. 7, 1971 now abandoned.

BACKGROUND OF THE INVENTION

This invention relates to methods for generating models of the subsurface characteristics of a well and, more particularly, to a method of generating a subsurface characteristic model which is consistent with readings taken in a borehole with a well logging device.

The subject matter of this invention is related to subject matter disclosed in the following U.S. Patent Applications, each filed of even date herewith and assigned to the same assignee as the present invention: U.S. Application Ser. No. 019,918 of F. Segesman; U.S. Application Ser. No. 019,925 of W. Kenyon; and U.S. Application Ser. No. 019,926 of C. Regat.

In the drilling of an oil or gas well it is advantageous to obtain as much information as possible about the nature of the formations or beds surrounding the drilled borehole. To this end, well logging devices are lowered into the borehole to measure various characteristic properties of surrounding formations. In electrical logging, for example, a device which includes an electrical sensor is moved through the borehole and provides indications of the electrical resistivity or conductivity of the subsurface materials at different depth levels.

For many well logging applications it is desirable that the logging device respond only to a very limited portion of the formation material; i.e., the portion that is adjacent the device at the time a measurement is taken. This is not easily accomplished, however. Ideally, it would be desirable for the vertical resolution of the device to be sharpened such that the apparatus will respond to formation material only over a vertical interval of very narrow extent. This would enable relatively thin beds to be more readily distinguished and their characteristics to be more accurately measured. At the same time, it is often desirable for the logging device to have a reasonably extensive capability of investigation in a horizontal or radial direction. Not surprisingly, the two considerations are found to be countervailing.

Consider, as an example, the type of well logging apparatus known as an "induction logging" device which includes, inter alia, transmitter and receiver coils mounted in spaced relation on a sonde. Alternating current is applied to the transmitter coil and the alternating magnetic field thereby created generates eddy currents in the formations surrounding the borehole. The eddy currents, in turn, create a secondary magnetic field which induces an electromotive force in the receiver coil. The intensity of the eddy currents is a function of the formation conductivity which can therefore be measured by monitoring the induced electromotive force. The basic principles of induction logging are described in an article by H. G. Doll entitled "Introduction to Induction Logging and Application to Logging of Wells Drilled with Oil Base Mud" which appeared in the June, 1949 issue of the Petroleum Transactions of the AIME. Among the techniques which have been devised for sharpening (or "focusing") the vertical response of induction logging devices is to provide additional coils on the sonde. These "focusing coils" are utilized in phased relationship with the basic transmitter and receiver coils to effectively cancel portions of the device response which are above and below the central investigative region of the device. Unfortunately, the use of numerous additional coils in this manner tends to significantly decrease the horizontal range of the device, so that is a practical limit on the degree of such focusing which can be employed. Also, the required additional elements render the device more complex and expensive.

In addition to focusing methods which relate to the overall response characteristic of the downhole device, there have been previously developed vertical resolution improvement methods which are termed "computed focusing" techniques. Generally speaking, computed focusing techniques utilize signals which are, at a given instant, more representative of the formation material in the undesired regions to adjust or correct the signal which is, at the same instant, more representative of the desired region. Computed focusing techniques are described, for example, in U.S. Pat. No. 3,166,709 of H. G. Doll, U.S. Pat. No. 3,230,445 of W. J. Sloughter et al, and U.S. Pat. No. 3,457,496 of N. Schuster. These patents describe systems that receive signals from a downhole sensing device and generate computed signals which approximate the response that would have been obtained from a sensing device having a sharper response characteristic. Each of the referenced patents discloses a relatively uncomplicated analog apparatus which can be utilized at a wellsite to produce an on-the-spot log. The apparatus temporarily stores signals obtained at various vertically spaced levels in a borehole and then combines the stored signals in appropriate manner to obtain effective log readings with improved vertical resolution.

While the signal processing techniques disclosed in the referenced patents provide useful results, the logs produced with these techniques nonetheless represent subsurface readings taken with a device having an effective response to substantial (though improved) vertical extent. To visualize the actual subsurface characteristics which, when measured, had produced the log, one must still take into account this effective response. Accordingly, it is one of the objects of the present invention to provide a method for generating a subsurface characteristic model which is consistent with readings taken with a device having an effective response of substantial vertical extent.

SUMMARY OF THE INVENTION

The present invention is directed to a method for generating a subsurface characteristic model which is substantially consistent with readings taken in a well with a well logging device. The method is preferably implemented by utilizing a general purpose digital computer which may typically be located at a site which is distant from the well.

In the above-referenced copending application of Segesman there is disclosed a method for computer generating a useful subsurface characteristic model. An embodiment of the Segesman method can be described briefly as follows: A set of actual measurement values which represent readings taken over a given depth interval of a well is derived. An initial trial model of the subsurface characteristic under investigation is then selected. A set of simulated measurement values is generated by applying the approximate response characteristic of the logging device to the discrete trial model. The simulated measurement values are compared with the actual measurement values and a set of error values are generated, each error value depending on the comparison at a particular depth level. The model is then modified so as to reduce individual error values. The modified trial model is next utilized to form a new set of simulated measurements which are, in turn, compared with the true measurement values. The model can then be remodified and the procedure continued in iterative fashion until there is obtained a model which yields acceptable simulated measurement values; i.e., simulated measurement values which approximately correspond to the actual measurement values. When such a model is obtained, there is good indication that the model values are a useful approximation of the subsurface characteristic being investigated.

The method of the present invention similarly utilizes a model of the subsurface characteristic from which simulated measurement values are generated and then examined with a view toward modifying the model. However, in the present invention there is generated an error function which reflects the comparison between the simulated and actual measurement values as taken over a substantial portion of the given depth interval. The model is then modified in a manner which tends to minimize this error function.

In a preferred embodiment of the invention, the gradient of the error function is calculated, and the model is then modified as a function of the gradient. In this manner, the number of modifications needed to minimize the error function is kept relatively small, with consequent saving of computer calculation time. This allows greater numbers of depth intervals to be processed per unit time.

Further features and advantages of the invention will be better understood from the following detailed description when taken in conjunction with the accompanying drawings.

BRIEF DESCRIPTION OF THE DRAWINGS

FIG. 1 is a functional diagram of a system for producing and processing well logging measurements representative of the subsurface characteristics of a well;

FIGS. 2 and 3 are representations of the response characteristics of well logging devices which are helpful in describing the concept of vertical geometrical factor;

FIG. 5 shows a group of curves which help illustrate the method of the invention;

FIGS. 10 and 11 are flow diagrams for machine programming the selection of initial model bed conductivities;

FIG. 17 is a flow diagram for machine programming a routine which calculates gradient and conjugate gradient directions utilized in an embodiment of the invention;

DESCRIPTION OF THE PREFERRED EMBODIMENT

Figure 3:
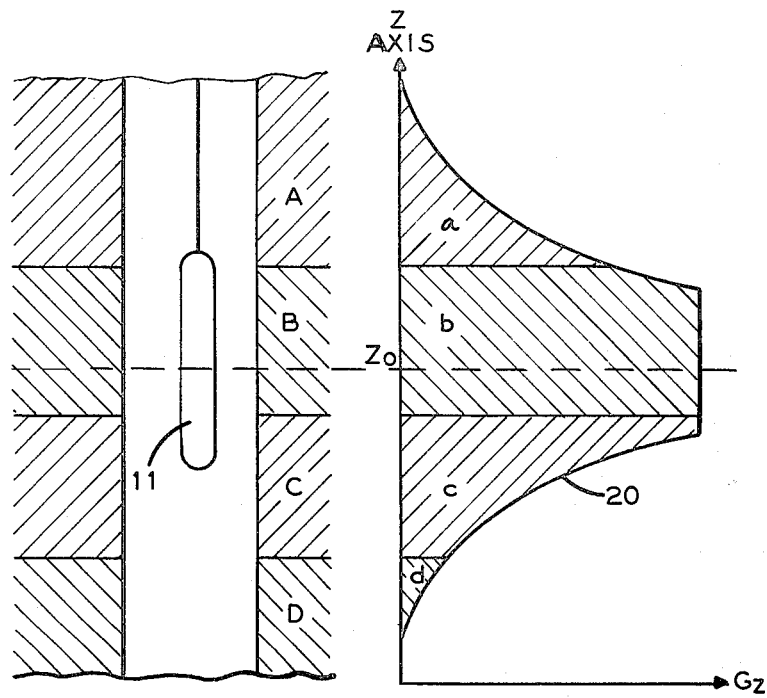

Referring to FIG. 1, there is shown a functional diagram of a system for producing and processing well logging measurements representative of the subsurface characteristics of a well or borehole 10. An investigating device 11 is suspended in the borehole on a cable 12. The length of the cable 12, which determines the relative depth of device 11, is controlled by suitable mechanical depth control means such as a drum and winch mechanism (not shown). The signals from investigating device 11 are coupled via cable 12 to signal processing circuitry 13 which, inter alia, converts the signals to a digital form for recording on a tape recorder 14. As is conventionally practiced, the tape recorder 14 is synchronized with the depth control means, such synchronization being depicted in FIG. 1 by the dashed linkage 15. The digital signals recorded on tape represent measurements taken at various depths in the borehole, typically measurements taken at six inch sampling intervals. The taped measurements are carried or transmitted via communications link to a computer center and entered in a prescribed fashion in a digital computer 16, as is represented by the dotted arrow 17. The computer 16 receives as an input a "derived" set of "true measurement values."

As defined herein, "true measurement values" is a generic term which describes the readings taken in a well with a well logging device. The readings may relate to any type of subsurface characteristic, but most typically would relate to conductivity or resistivity. The readings may be subject to little or no signal processing or to complex processing, coding/decoding or the like. For example, the readings may be utilized in the very form in which they are received from a simple logging device. On the other hand, the readings may be subjected to computed focusing techniques (referenced above), encoding for recording and transmission, decoding, etc., before being entered in the computer. In any event, the "true measurement values" represent, in some form, actual measurements taken in a well or borehole. The contrast of this term with the term "simulated measurement values" will become later apparent.

The term "deriving" as used herein, is also generic and is intended to include in its definition the acts of measuring or of recovering measurements previously taken. In the simplest sense, therefore, the "deriving" of measurements may consist merely of measuring well log readings. On the other hand, the deriving of measurements may consist, for example, of recovering previously taken well log readings from a recording tape or from the receiver of a communications link.

It should be noted here that the particular type of logging device, signal processing circuitry, and recording and communications means utilized to obtain true measurement values is a matter of convenient choice. Indeed, if an appropriate computer were available at the wellsite it would be possible to enter measurement values directly without recording or transmitting these values. As will become understood, the principles of the invention are applicable to different types of true measurement values having a variety of past histories. For ease of illustration, however, let us assume that the device of FIG. 1 is of the conventional induction logging type which measures conductivity (or resistivity), that no computed focusing techniques are employed in the signal processing circuits 13, and that the measurement values recorded on tape are carried to the location of a general purpose digital computer.

In the discussion that follows, use will be made of diagrams representing the cross-section of the ground intercepted by a vertical plane containing the axis of a borehole. Each "region" of ground—which means here a volume of ground having a symmetry of revolution around the borehole—will be represented on such diagrams by its cross-section by the plane of the figure. When dealing with the response of a borehole investigating device it is convenient to make use of descriptive vehicle known as the "vertical geometrical factor." The vertical geometrical factor, and especially its application to induction logging devices, is explained in the above-referenced Doll article and the above-referenced patents of Doll, Sloughter and Schuster. The vertical geometrical factor takes into quantitative account the fact that the sensitivity region of a logging device positioned at a given measure point actually extends over a substantial vertical region above and below such measure point. The vertical geometrical factor effectively "weights" the contributions to overall device response of different layers of ground depending on their vertical distance from the measure point.

An understanding of the vertical geometrical factor associated with an induction logging device can be gained with the aid of FIG. 2 which depicts an induction sonde positioned at at depth $z_o$ (as determined by the center or so-called "measure point" of the sonde). Assume that all space around the borehole is divided into an infinite number of horizontal beds of minute thickness $\Delta z$, each referred to as a "unit bed" and characterized by its altitude $z$ with respect to the measure point, $z_o$. The vertical geometrical factor of each such unit bed (i.e., its contribution to device response) is designated $G_z$, and the curve 20 is an approximate plot of the $G_z$'s vs. z for a typical induction logging device. The curve 20, referred to as the "vertical investigation characteristic" of the device, is normalized to unity by setting $\rho G_z \Delta z = 1$, or, in the limit as $\Delta z \to 0$, $$\text{All } \Delta z \int_{-\infty}^{+\infty} G_z dz = 1.$$

Consider, now, the four beds, A, B, C and D, of finite thickness shown in FIG. 3. The vertical geometrical factors of the beds, $G_A$, $G_B$, $G_C$ and $G_D$ are equal to their corresponding relative areas under the curve 20, i.e.:

$$G_A = \frac{a}{a+b+c+d}$$

$$G_B = \frac{b}{a+b+c+d}$$

$$G_C = \frac{c}{a+b+c+d}$$

$$G_D = \frac{d}{a+b+c+d}$$

In view of the normalization just mentioned, $a+b+c+d$ equals one, so that $G_A=a$, $G_B=b$, $G_C=c$ and $G_D=d$. Now, if we designate $\sigma_A$, $\sigma_B$, $\sigma_C$ and $\sigma_D$ as the four bed conductivities, the response $L(z_o)$ of the logging device 11 at the depth $z_o$ (i.e., the measured log reading at that depth) can be expressed as $$L(z_o) = G_A\sigma_A + G_B\sigma_b + G_C\sigma_C + G_D\sigma_D \quad (1)$$

or, $$L(z_o) = a\sigma_A + b\sigma_b + c\sigma_C + d\sigma_D \quad (1a)$$

Generally, the response of the logging device at a depth z is $$L(z) = \Sigma G_i \sigma_i \quad (2)$$

where the summation is taken over all beds falling within the response range of the device, and the $\sigma_i$'s and $G_i$'s are the respective conductivities and vertical geometrical factors of these beds. As stated, the vertical geometrical factor of a particular bed is seen to be dependent upon the location of the bed with respect to the device's measuring point. For example, in FIG. 3, if the device were moved to an altitude slightly above $z_o$, the vertical geometrical factor of bed A (viz., area a) would become larger while the vertical geometrical factor of bed D (viz., area d) would become smaller.

The problem associated with utilizing a device having a relatively wide vertical response, as previously discussed, should now be readily apparent. For example, referring again to FIG. 3, the measure point $z_o$ of device 11 is located in the approximate center of bed B and, ideally, the device should be indicating a reading which only reflects the conductivity, $\sigma_B$, of bed B. However, the reading indicated by the logging device will, in reality, be determined by equation (1) or (1A) wherein $L(z_o)$ depends upon the conductivities $\sigma_A$, $\sigma_C$, and $\sigma_D$ as well as upon $\sigma_B$. It should be noted in this context that the relative width of the device response must be considered with relation to the width or thickness of the beds being examined. This can be illustrated, for instance, by considering the case where bed B is relatively wide and extends over the entire depth interval depicted in FIG. 3. In such case the reading taken at $z_o$ would be equal to $G_B\sigma_b$, there being no other beds lying within the device response curve. Also, due to the unity normalization of the vertical geometrical factor, $G_B$ would equal one so that the logging device would indicate a reading which substantially equals $\sigma_B$, the actual conductivity of bed B. Unfortunately, formation beds encountered in real-life situations are often substantially thinner than the effective device response width.

The technique of the present invention enables determination of a useful model of subsurface bed conductivity values notwithstanding the vertical resolution limitations of well logging devices. In obtaining a meaningful model it is helpful to assume that the subsurface formations being studied consist of well-defined beds of finite width each having a conductivity (or other measured parameter) which is essentially constant within the bed. Such simplifying assumptions are not strictly accurate, of course, since formation beds deposited by nature are not exactly homogeneous and well defined. Stratified geological models of the type utilized herein are, however, generally consistent with natural depositional considerations and are expedient since exact geological soluations are not feasible in a practical sense.

Figure 4A:
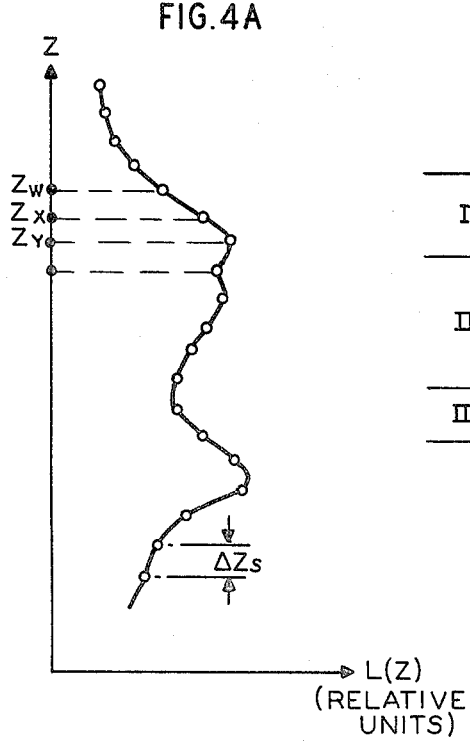
FIG. 4A is a log of conductivity readings taken at specified sampling intervals.
Figure 4B:
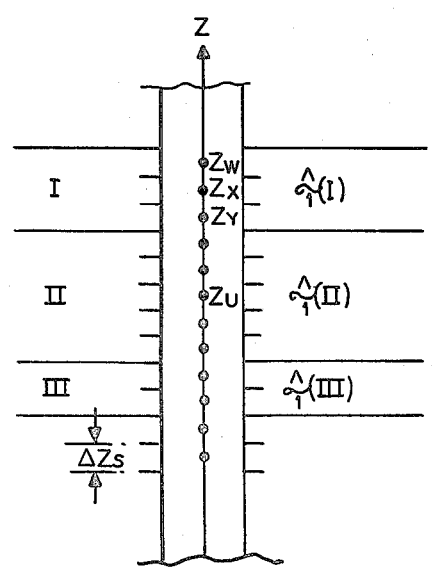
FIG. 4B is a model of subsurface formations, the model being of the type utilized in the present invention.

The tape of recorder 14 of FIG. 1 has recorded thereon a set of true measurement values taken over a given depth interval of the wall 10. Referring to FIG. 4A, there is illustrated a "log" of conductivity readings $L(z)$ taken at sample intervals denoted $\Delta z_S$. As was previously indicated, $\Delta z_S$ is typically six inches, but it will become clear that the method of the invention is not dependent upon the sampling interval and, for example, readings derived from a "continuous" log could be readily utilized herein. (The resolution of the original log is, however, limited by the sampling interval; so an unduly large sampling interval is not desirable.) In the preferred embodiment of the invention, there is initially selected a trial model which includes discretely boundaried beds, the locations of boundaries being based on sub-surface characteristic data. In this embodiment the original model is formed by the computer from the true measurement values and stored therein, but an externally generated model could, if desired, to read into computer memory. (Also, it will be appreciated that the original model may, if desired, be based on data from the well which is other than the true measurement values, such as data taken with a different logging device. This technique would, however, require accurate depth matching of logs.) In FIG. 4B, a portion of a model of subsurface formations is illustrated as consisting of a plurality of beds, each bed containing an integral number of sample intervals $\Delta z_S$. For example, the model bed I is three sample intervals wide and contains the depth levels $z_w$, $z_x$ and $z_y$ at which true measurement values had been taken. Similarly, the beds II and III are shown as respectively containing five and two depth level measure points. Each bed is assumed to have a homogeneous conductivity throughout its volume generally designated as $\hat{\sigma}_1(J)$ for bed J of the original model. As will be later described, the locations of model boundaries may be determined by computing the variance of subsurface characteristic data and then selecting model boundaries at local maxima of the variance.

Referring to FIG. 5, there is shown as group of curves which illustrate, in general terms, the type of subsurface characteristic model which is obtained with the method of this invention. The solid-line curve 200 represents a plot of true measurements, designated $L(z)$, as taken with an induction-type well logging device. The uppermost curve 201 is a plot of the variance, designated V(z), of the curve 200. Local maxima in the variance curve are indicated by dashed vertical lines 204 which are used to define the depth levels at which model boundaries are selected. An initial conductivity value is chosen (in a manner to be described) for each model bed to obtain a "rectangularized" initial model as shown by the broken-line curve 202. During the method, the model conductivity within each bed is "enhanced" to ultimately obtain the solid-line curve 203 which represents the final approximation of the subsurface conductivities which had given rise to the true measurement curve 200.

Briefly, the enhanced conductivity values are obtained as follows: A set of simulated measurement values is generated by applying the response characteristic of the logging device to the initial model (curve 202). The obtained simulated measurement values are represented by the broken-line curve 205. The simulated measurement values are then compared to the true measurement values, the broken-line curve 206 being a typical plot of the comparison, designated "E(z)." An error function to be minimized is taken as reflecting the comparison over the entire interval being examined (or at least a substantial portion of it). A preferred error function is determined by the total area of curve 206 above and below the zero baseline. This error function depends on the sum of the absolute values of individual "errors" (i.e., individual values of E(z)), with the summation being taken over the whole depth level under consideration. Such an error function is particularly useful since it is a measure of the "quality" of a model taken over a substantial depth interval rather than just the quality of the model in a very localized area such as a single measure point. The conductivity model is modified in a manner which tends to minimize the error function. After one or more of such modifications, there is ultimately obtained the "enhanced" model represented by the rectangularized curve 203. Ideally, if the response characteristic of the logging device was applied (in the simulated sense) to the rectangularized model 203, the curve obtained should clearly approximate the true measurement curve 200. If so, there would be good indication that the final model is a useful approximation of the subsurface conductivity being investigated. In FIG. 5, the dotted-line curve 207 and solid-line curve 208 respectively represent plots of simulated measurements and E(z) values resulting from the model of curve 203.

The method of this embodiment will now be described in further detail. As alluded to briefly above, a useful approach for the location of the approximate bed boundaries is to derive a secondary curve from the true measurement values by calculating the variance within a "window" of preselected size and then to locate maxima in the plot of such variance. The local maxima in the variance curve are selected as bed boundaries. This technique of boundary selection is disclosed in detail in the copending application of W. E. Kenyon and is illustrated with the aid of FIG. 6 wherein there is shown a curve 300 which consists of measurements $L(z)$ taken with a logging device over a given depth interval that is depicted as including 100 data points extending from a depth level $z=1$ to a depth level $z=100$. In the illustration, the variance is calculated over a "window" of 5 depth units which means that each variance calculation reflects the activity over a particular group of 5 adjacent log readings. For example, the bracket 301 includes the 5 data points (z=6 through z=10) which are utilized in calculating the variance at the central depth level z=8. Similarly the brackets 302 and 303 show the data points which are included in calcuating the variance at the depth levels z=9and z=10. The curve 310 is a plot of the variance calculated over the depth levels between z=8 and z=92. Boundaries are selected from the variance curve 310 by choosing a boundary whenever a "local maximum" in the variance curve is observed. A local maximum in the variance curve is defined as a data point having a variance which is greater than the variance at either of its adjacent neighbors.

Figure 6:
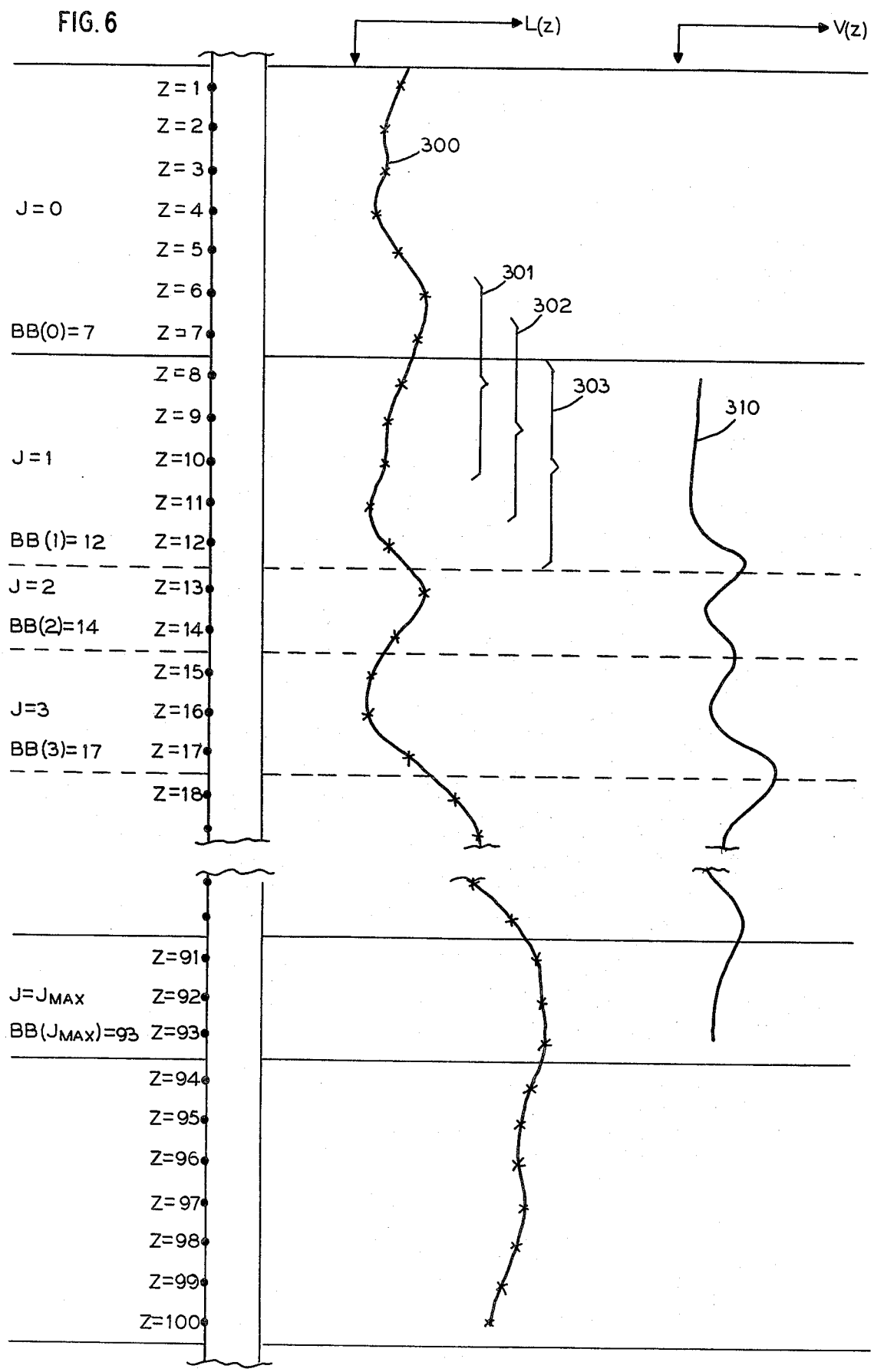
FIG. 6 shows a log of subsurface conductivity readings and the manner in which such readings are used in determining model bed boundaries.

The window size of FIG. 6 encompasses 5 data points, but it will be appreciated that larger or smaller window sizes can be utilized if desired. Generally, the variance curve is found to become smoother as the size of the window is increased. For the window of M data points the variance at a given depth level can be defined by the equation $$V(z) = \frac{1}{M} \Sigma ([L(i)]^2 - [\overline{L}(z)]^2) \qquad (3)$$

$$\text{where } \overline{L}(z) = \frac{1}{M} \Sigma L(i)$$

and both summations are taken over all depth levels i in the window. For the case of FIG. 6, M is set equal to 5. Thus, for example, the variance at the depth level z=8, can be calculated by first computing the average of the log readings in the window z=6 through z=10 and then at each depth level in the window subtracting the square of this average value from the square of the log reading at the particular depth level. The sum of this difference taken over the window and divided by the number of depth level points in the window gives the variance at the center of the window, z=8. For reasons which will become later apparent, the variance for the data of FIG. 6 is calculated for only the range of z=8 to z=92.

Figure 7:
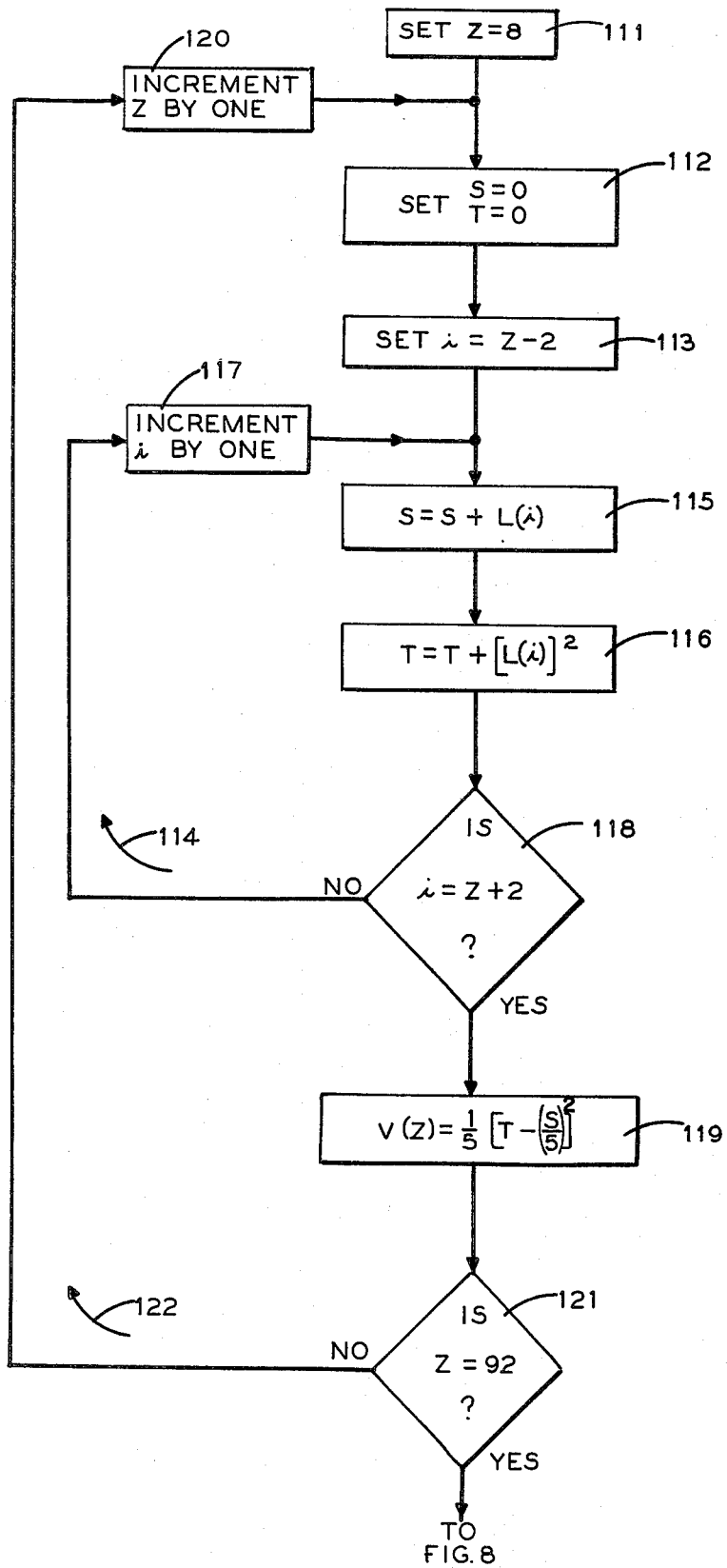
FIG. 7 is a flow diagram for machine programming the computation of variance values utilized in determining model bed boundaries.

Referring to FIG. 7 there is shown a flow diagram for machine programming the computation of variance for the interval under consideration in FIG. 6. The depth level index, z, is set equal to 8 (block 111) and the dummy variables S and T are initialized at 0 (block 112). For the calculation of variance at each point, the dummy variable S is utilized in calculating $\overline{L}(z)$ and the dummy variable T is utilized in calculating the quantity $\Sigma[L(i)]^2$. The variable i is set to z−2 (block 113), i.e., two depth levels above the depth level at which the variance is being calculated at the particular time. The quantities S and T are next calculated by action of a loop which is indicated by the loop arrow 114 as follows: The value of S is increased by an amount L(i) (block 115), the value of T is increased by an amount [L(i)]² (block 116), i is successively incremented by one (block 117), and the loop 114 continues until i is equal to the last depth level in the window, i.e., i=z+2 (block 118). The value of the variance for the particular depth level under consideration, V(z), is next calculated in accordance with the block 119 as $$V(z) = \frac{1}{5} \left[ T - \left( \frac{S}{5} \right)^2 \right]$$

which is equivalent to the quantity indicated by the above equation (3). The value of V(z) is calculated for each depth level in the range z=8 to z=92 (block 120 and decision diamond 121) by action of the main loop 122.

In setting up boundaries it is helpful to utilize a "bed boundary" index, BB(J), which designates the depth level of the lower boundary of the bed J. In FIG. 6 a top "end bed" is selected as including the depth levels z=1 to z=7. The reason for this selection will be explained hereinbelow. This top end bed is designated by J=0; so, by definition, BB(O)=7. The bed directly below the top end bed is designated by J=1 and its bed boundary index is designated by the last depth level in the bed, which happens to be BB(l)=12 for the particular illustration of FIG. 6. Each bed in the depth interval under consideration is designated in this manner.

Figure 8:
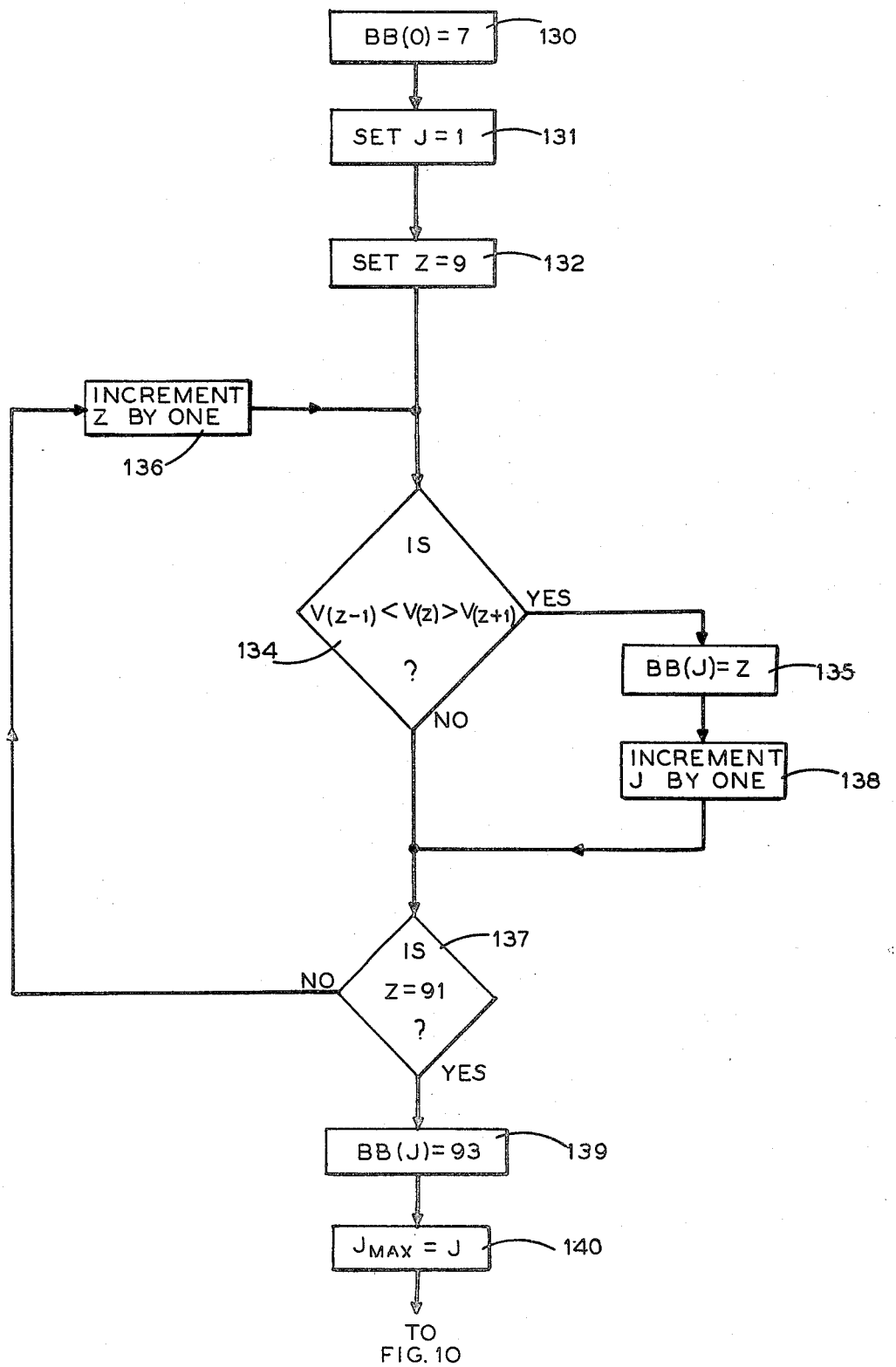
FIG. 8 is a flow diagram for machine programming the selection of bed boundaries.

Referring to FIG. 8, there is shown a flow diagram for machine programming the selection of bed boundaries utilizing the variance values previously calculated. The block 130 sets up the top end bed as having a bed boundary index designation of BB(O)=7. The bed index J is next initialized at 1 (block 131) and the depth level index z is initialized at 9 (block 132). During the next phase of the programmed method each depth level in the interval under consideration is examined to determine if a bed boundary is appropriate at such depth level. The criteria of boundary selection is such that successive boundaries must be at least two depth units apart and, therefore, the first depth level investigated for the possible presence of a boundary is z=9. As above stated, for purposes of the present embodiment a boundary is defined as existing when a local maximum occurs in the variance curve. This condition can be generally stated by the inequality $$V(z-1) \leq V(z) > V(z+1)$$

with this criteria being set forth by the decision diamond 134 of FIG. 8. When the variance at a particular depth level is found to be greater than the variance at either of the adjacent depth levels, the "yes" output of diamond 134 is active and block 135 results in the effective generation of a boundary at the depth level being examined. This is accomplished by setting the next bed boundary index equal to such depth level. If, however, the criteria of diamond 134 is not met, the program is directed to the block 136 via the diamond 137, and the depth level index z is incremented by 1. In the case where a boundary had been found, J is incremented by 1 (block 138) and the incrementation of block 136 is again effected via diamond 137. The depth levels of successive boundaries are thus stored as the bed boundary index BB(J), with J being incremented by 1 each time a new boundary is sensed. This phase of the program continues until the decision diamond 136 indicates that the depth level z=91 has been reached, whereupon the last bed boundary is established at z=93 (block 139). A bottom end bed containing 7 depth units is thus established, for reasons which will become later apparent. The boundary z=93 is the last boundary in the interval under consideration and is designated as $J_{max}$ (block 140).

Reviewing briefly to this point, at the completion of the routine of FIG. 8, there have been established a number of beds (including two end beds) ranging from J=0 to J=$J_{max}$ (see FIG. 6), the lower boundary of each bed J being designated by a bed boundary index, BB(J)=z.

Having established the boundaries of a model, the next step is to select a trial conductivity value for each bed of the model (see curve 202 of FIG. 5). A suitable technique is disclosed in the above-referenced copending application of Kenyon which discloses a selection technique that is based on the examination of the derivative of the true measurement curve (curve 200) at the selected boundaries. The rules of selection are as follows:

A. When the derivative is positive at the bed's upper boundary and negative at its lower boundary, the maximum log reading in the bed is selected. This situation is illustrated by case A of FIG. 9.

B. When the derivative is negative at the bed's upper boundary and positive at its lower boundary, the minimum log reading in the bed is selected. This situation is illustrated by case B of FIG. 9.

C. When the derivative has the same sign at the upper and lower boundaries, the log reading at the point of minimum variance in the bed is selected. This situation is illustrated by case C of FIG. 9.

Figure 9:
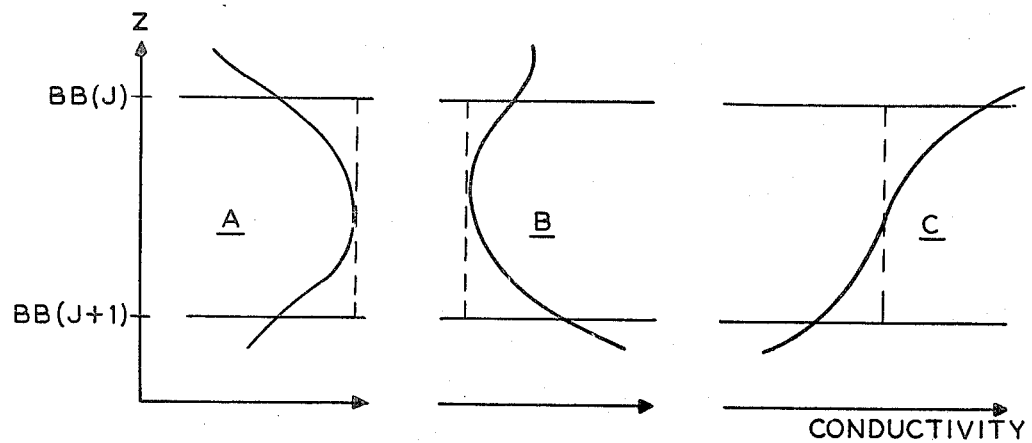
FIG. 9 shows three curves which illustrate the criteria for selection of initial model bed conductivities.

In each case of FIG. 9 the dotted line depicts the conductivity selected for a particular bed depending upon the behavior of the derivative at the bed boundaries. The sketches of FIG. 9 are intended to illustrate the rationale behind the selection criteria and show that a reasonably representative value is generally obtained. It will be appreciated, however, that in certain situations the selection criteria may yield initial model values which do not appear so intuitively reasonable.

Referring to FIG. 10, there is shown a flow diagram for machine programming the selection of initial model values in accordance with the criteria discussed in connection with FIG. 9. The bed index J is initialized at 1 (block 151) and the depth level index z is set to a depth level which lies directly above the bed being considered; i.e., $z = BB(J-1)$ (block 152). The derivative at the top boundary of the bed is next estimated by comparing the true measurement values at the depth level on either side of the bed boundary. This comparison is represented by the decision diamond 153. When $L(z+1)$ is greater than or equal to $L(z)$ the log reading is increasing as the boundary is crossed and the derivative is estimated as being positive. In this case an operator FP is set equal to 1 (block 154). For the case in which $L(z)$ is greater than $L(z+1)$ the derivative is estimated as a negative quantity and the operator FP is set equal to $-1$ (block 155). A similar operation is next performed at the lower boundary of the bed being considered. The depth level index is set to the last depth level in the bed (block 156) and the log reading at this point is compared with the log reading at the next depth level (diamond 157). Now, another operator, LP is set to either 1 or $-1$ depending on the polarity of the estimated derivative (blocks 158 and 159). The estimated derivatives at the top and bottom boundaries of the bed under consideration are then compared (block 160) and one of the three criteria corresponding to the cases A, B and C of FIG. 9 are selected by routing to one of the blocks 170, 180 or 190. The bed index J is then examined to determine if the last bed before the bottom end bed has been treated (diamond 161) and, if not, the bed J is incremented by 1 (block 162) and the initial model value for the next bed selected in the same manner. The routine thus continues until initial model values for all beds between the end beds have been selected.

Figure 11:
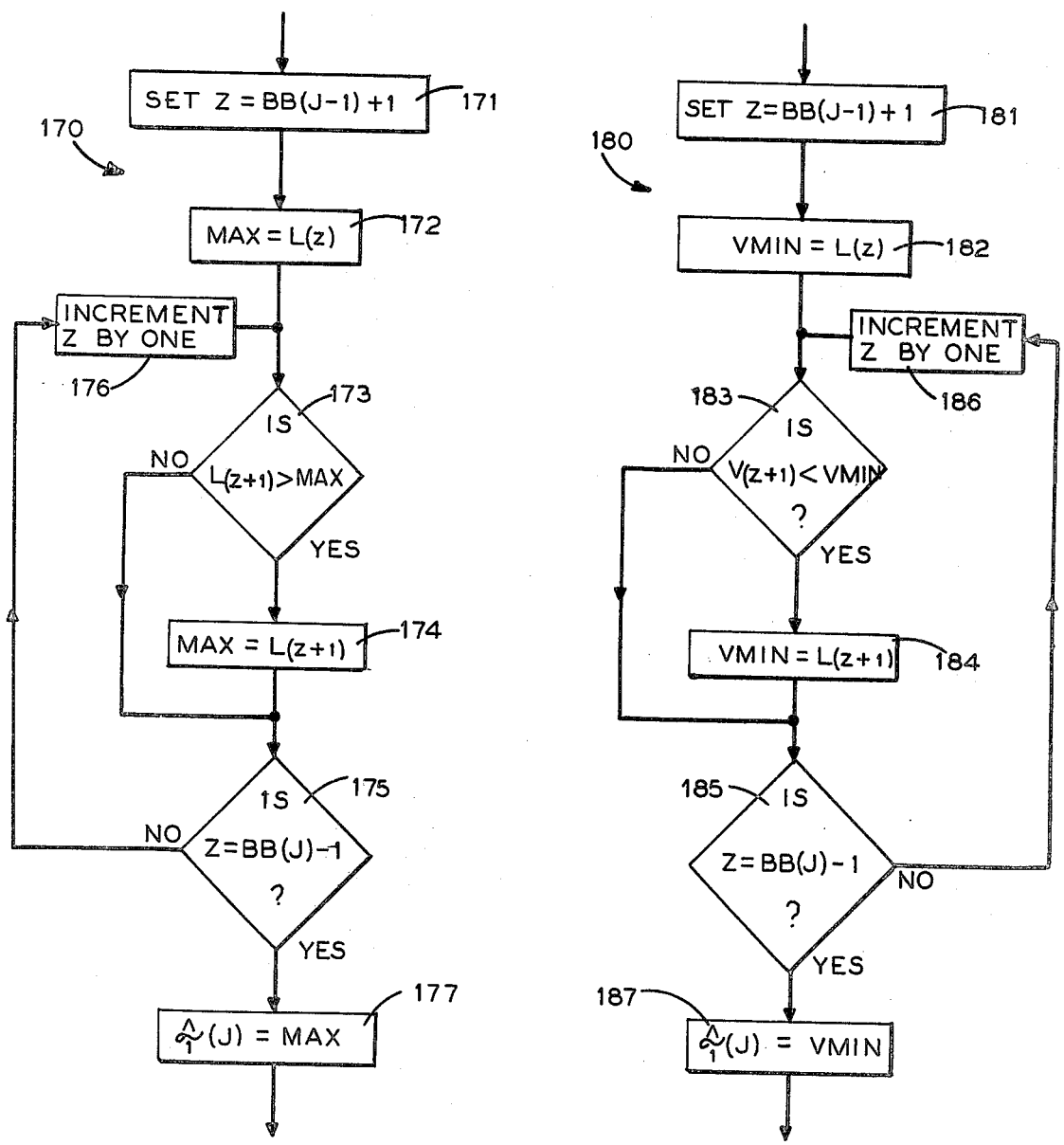

Referring to FIG. 11, there are shown flow diagrams for achieving the functions represented by the blocks 170 and 180 of FIG. 10. The routine 170 scans all log readings within a given bed J to determine the maximum log reading so that the initial model value in the bed can be set equal to this log reading. The depth level index z is set to the top depth level in the bed under consideration; i.e., $BB(J-1)+1$ (block 171). An operator MAX is set equal to the log reading at this depth level (block 172). The log reading at the next depth level is then compared to MAX (diamond 173) and, if the log reading at such depth level is greater, the operator MAX is changed to the greater value (block 174). The reading at each depth level in the bed is examined in this manner by virtue of the diamond 175 and the incrementation block 176, such that after having scanned all depth levels in the bed the value of MAX has been set equal to the highest log reading. The initial model conductivity in the bed, designated $\hat{\sigma}_1(J)$, is then set equal to the operator MAX (block 177).

The routine for the function of block 190 of FIG. 10 is the same as the routine of block 170 except that the log reading at each depth level is scanned for a minimum rather than a maximum. The routine for the function of block 180 is shown in FIG. 11 and is seen to also involve the scanning of all depth levels within the particular bed J being considered (block 181, diamond 185, and block 186). In this routine, however, the value of the log reading at the depth level having the smallest variance value associated with it is stored as the operator VMIN (block 182, diamond 183 and block 184), and the initial model conductivity in the bed is set equal to this operator value (block 187).

Figure 20:
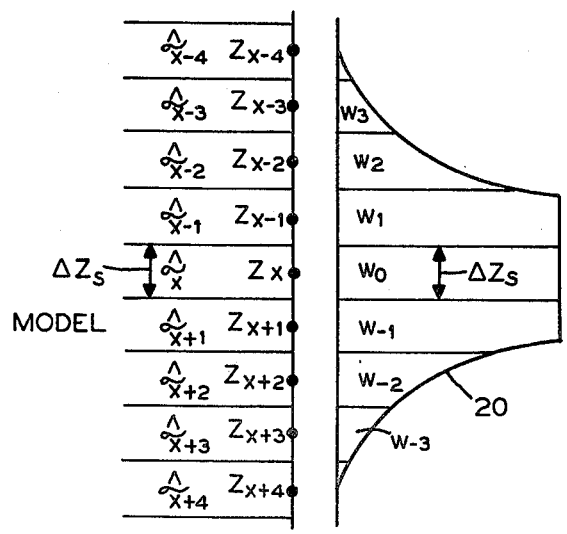
FIG. 20 shows a response curve alongside a particular model which is helpful in describing arrays utilized in the method of the invention.

Having established an initial model of the type illustrated by curve 202 (FIG. 5), it will be recalled that a set of simulated measurement values is to be generated by applying the approximate response characteristic of the logging device to the model. When programming the computer to repeatedly perform this type of operation, it is helpful to establish arrays which facilitate calculations in accordance with the above equation (2). In setting up these arrays, and recalling the discussion in connection with FIGS. 2 and 3, it is convenient to first visualize the device response curve 20 as divided into a number of strips, each strip having a width equal to the sampling interval $\Delta z_s$. In FIG. 20 a response curve 20, divided in this manner, is pictured alongside a model which is divided into a plurality of thin "beds", each thin bed being one depth unit wide and having model conductivities as shown. This type of modeling is described in detail in the above-referenced copending application of F. Segesman. Using this model, a simulated measurement at the depth level $z_x$ can be conveniently calculated as $$\hat{L}(z_x) = w_3\hat{\sigma}_{x-3} + w_2\hat{\sigma}_{x-2} + w_1\hat{\sigma}_{x-1} + w_0\hat{\sigma}_x + w_{-1}\hat{\sigma}_{x+1} + w_{-2}\hat{\sigma}_{x+2} + w_{-3}\hat{\sigma}_{x+3}$$

where $w_3$ through $w_{-3}$ are the areas or "normalized geometrical weighting factors" of the strips of the device response curve 20. Using the notation of FIG. 20, it is seen that, in general, the contribution to the simulated measurement taken at a measure point depth level $z_x$ by a thin bed centered at a depth level $z_y$ is weighted by a factor $w_{x-y}$. For example, the contribution to the simulated measurement taken at a measure point $z_x$ by the bed at $z_{x-3}$ (i.e. letting $y = x - 3$) is $w_{x-(x-3)}$, or simply $w_3$. In view of this relationship, and having as input information the weighting factors $w_3$ through $w_{-3}$, a geometrical weighting factor notation designated "$w(z_x,z_y)$" can be established in the computer by calculating $$w(z_x,z_y) = w_{x-y}$$

for any measure point depth level $z_x$ with respect to a one-depth-unit-wide bed centered at a depth level $z_y$. A further condition is that $w(z_x,z_y)=0$ when $|x-y|>3$, which merely means that the geometrical factors of areas outside the effective device response are zero. The seven depth unit wide device response of FIG. 20 is utilized for convenience of illustration of the weighting factor notation. It will be understood, however, that the principles described in connection therewith are easily extendable to apply to longer and more practical device responses.

Figure 12:
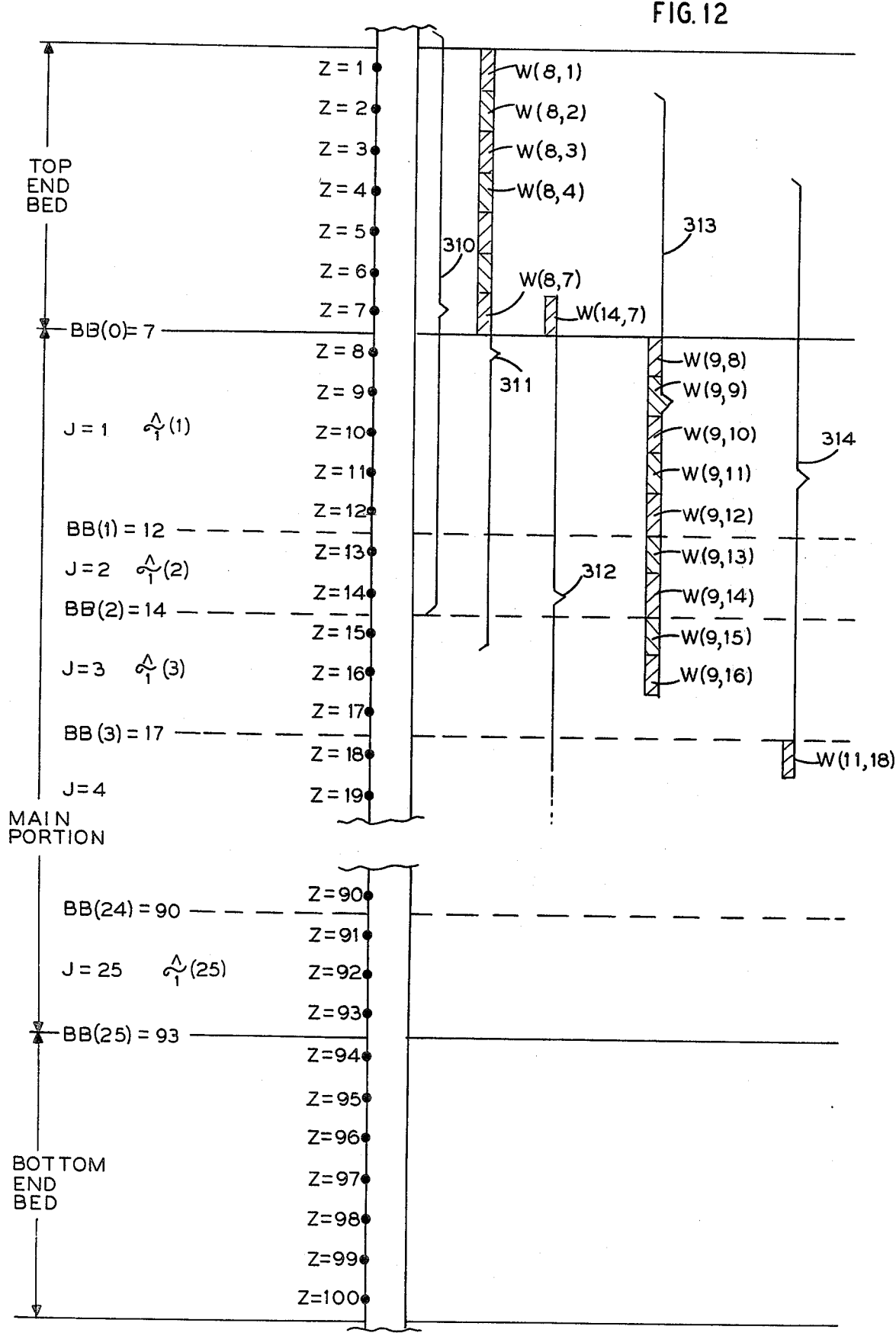
FIG. 12 shows a portion of a subsurface characteristic model and helps illustrate the technique of generating simulated measurements from a model.

FIG. 12 shows the given interval depicted in FIG. 6 with model beds having boundaries and initial conductivities as previously calculated for a particular case. In generating simulated device responses for this embodiment it will be assumed for illustration that the effective device response extends over 15 depth units, although again it should be stressed that this parameter is easily varied. The rationale for designating top and bottom "end beds" which are seven depth units wide can now be visualized by considering the bracket 310 as representing the device response positioned for a measurement at the depth level $z=7$. It is seen that simulated measurements taken at this depth level and above would require knowledge of conductivities outside the given interval. The same holds true for depth levels in the bottom end bed; i.e., depth levels below $z=93$. The extent of the end beds can be determined for a given case by the effective span size of the logging device vertical extent. The portion of the given interval between the end beds is referred to hereinafter as the "main portion" of the given interval.

It will be recalled that the bed-boundary index, denoted BB(J), is used to correlate the selected bed boundaries with the depth level index z. The index BB(J) designates the lower boundary depth level of the $J^{th}$ bed in the main portion of the given interval. The initial model conductivity of the $J^{th}$ bed is designated $\hat{\sigma}_1(J)$. In the case of FIG. 12, it is assumed that the initial model was found to consist of 25 beds having boundaries as shown by dotted lines. Thus, the first bed (J=1) has an initial model conductivity of $\hat{\sigma}_1(1)$ and a bed-boundary index BB(1)=12. The next bed (J=2) has an initial model conductivity of $\hat{\sigma}_1(2)$ and a bed boundary index of BB(2)=14, and so on. The end boundaries of the main portion are seen to be BB(0)=7 and BB(25)=93.

There will now be generated a pair of arrays which are to be later utilized in the "reconstruction" process; i.e., in the process of reconstructing a set of simulated measurements from a particular conductivity model. Numerous reconstructions may be required during an overall iterative procedure, and it will become understood that the formation of these matrices can save considerable computer operation time in the long run. Also, as will become clear, certain of the array members are to be utilized in determining an optimum manner of model modification.

The first array to be generated is referred to as an "end-effects" array since it takes into account the effect of the endbeds on the various measure points within the main portion of the given interval. As was stated above, simulated measurement values within the end beds are not completely obtainable from information within the given interval. Therefore, the initial model conductivities within the end beds are maintained throughout the present method and are not enhanced by iterative technique. These initial model conductivities within the end beds may be selected from the input true measurement values. In FIG. 12, for example, each of the two end beds can be visualized as consisting of seven thin beds, each thin bed being one depth unit wide and having a conductivity, $\hat{\sigma}_d(z)$, which is set equal to the true measurement value, L(z), at its particular depth level. This type of modeling is utilized in this embodiment only for the end beds, and, as previously noted, is described in detail in the above-referenced copending application of F. Segesman. Another approach to handling end beds is described in the above-referenced copending application of W. E. Kenyon.

The top end bed has an effect on the simulated measurements taken at $z=8$ through $z=14$ in the main portion of the given interval. The effect of the top end bed on the simulated measurement at $z=8$ (the measure point most affected by the top bed) is designated $D_T(8)$ and can be calculated as $$D_T(8) = \hat{\sigma}_d(1) \cdot w(8,1) + \hat{\sigma}_d(2) \cdot w(8,2) + \ldots + \hat{\sigma}_d(7) \cdot w(8,7).$$

This calculation is illustrated by the shaded areas under bracket 311. The effect of the top end bed on the simulated measurement at $z=14$ (the measure point least affected by the top end bed) is $$D_T(14) = \hat{\sigma}_d(7) \cdot w(14,7),$$

as is illustrated by the shaded area under the bracket 312. In general, $D_T(z)$ can be calculated as $$D_T(z) = \sum_{h=1}^{7} \hat{\sigma}_d(h) \cdot w(z,h) \qquad (4)$$

for $8 \leq z \leq 14$, where it should be kept in mind that $w(a,b)=0$ whenever $|a-b|>7$.

In the manner of the previous paragraph, it can be shown that the bottom end bed affects the simulated measurements at $z=87$, through $z=93$, and the effect, $D_B(z)$, can be calculated as $$D_B(z) = \sum_{h=1}^{7} \hat{\sigma}_d(94-h) \cdot w(z, 94-h) \qquad (5)$$

for $8 \leq z \leq 14$

Figure 13:
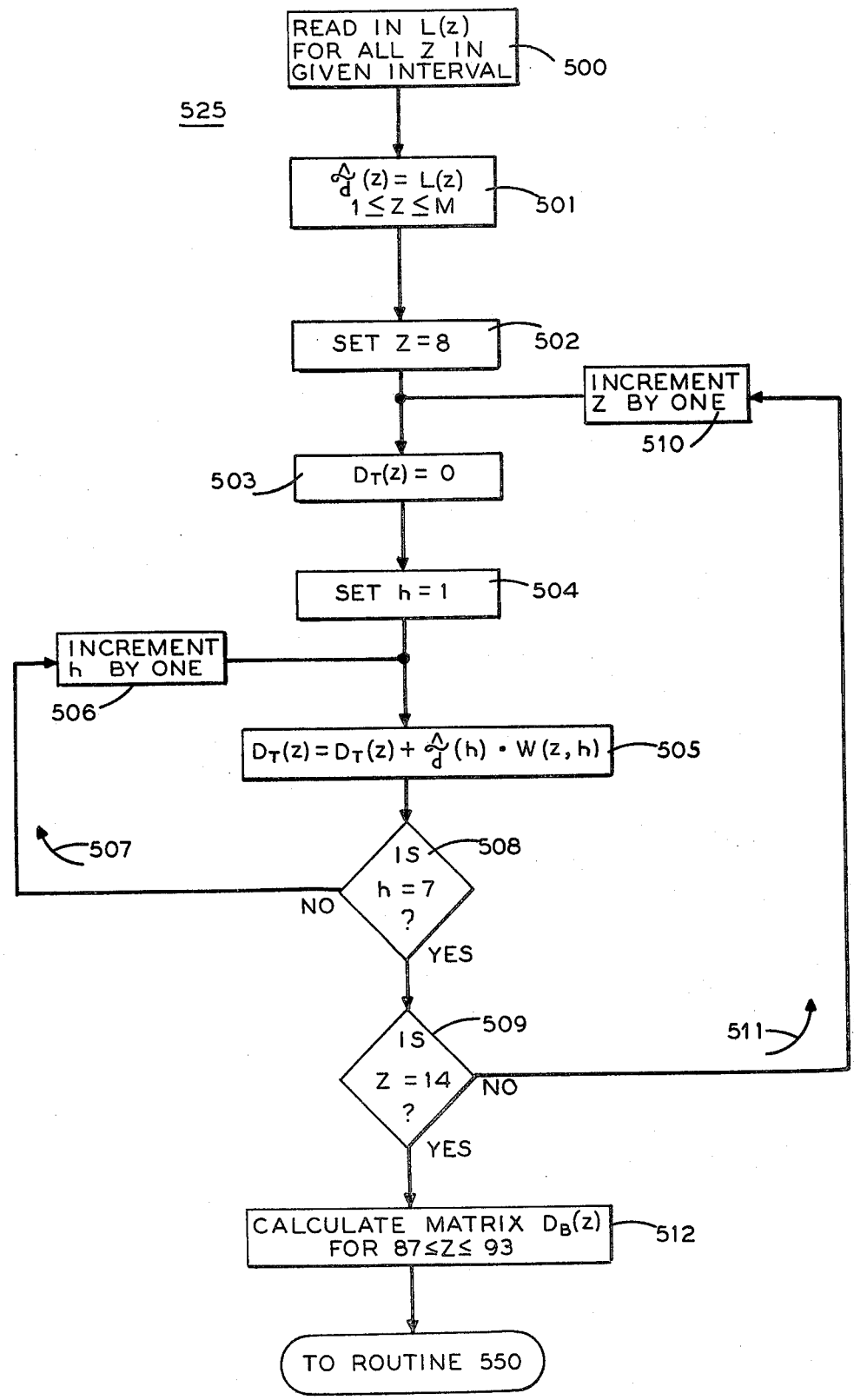
FIG. 13 is a flow diagram for machine programming the computation of array members utilized in generating simulated measurements from a model.

Referring to FIG. 13, there is shown a flow diagram for machine programming a routine 525 which calculates the end-effects array members, $D_T(z)$ and $D_B(z)$. The true measurement values, L(z), are first read in for all z in the given interval; i.e. $1 \leq z \leq 100$ for the example of FIG. 12 (block 500). The model conductivities in the end beds are established as equal, at each depth level, to the true measurement values, L(z) (block 501). Then, z is initialized at 8, the first end-effects array value, $D_T(z)$ is initialized at zero (block 503) and the index h is set to one (block 504). The value of $D_T(z)$ is then increased by an amount $\hat{\sigma}_d(h) \cdot w(z,h)$ (block 505), h is incremented by 1 (block 506), and $D_T(z)$ again increased by an amount $\hat{\sigma}_d(h) \cdot w(z,h)$. The small loop, indicated by the loop arrow 507, continues in this fashion until h=7 (decision diamond 508), whereupon the value of $D_T(z)$ has become equal to the desired summation specified by the above equation (4). The current value of z is next examined (diamond 509), and if z is less than 14 it is incremented by one (block 510) and the next value of $D_T(z)$ is computed. Thus, in the larger loop 511, the values of $D_T(z)$ are calculated for all z from 8 to 14.

The block 512 represents the calculation of the array values $D_B(z)$; i.e., the effects of the bottom end bed on the measure points from z=94 to z=100. The calculation of block 512 is performed in a manner similar to the calculation of the $D_T(z)$ array values, except that equation (5) is used as a basis.

The next array to be generated during the initial phase of the present method is designated as the "G-array." The members of this array specify the geometrical factor of each bed in the model as taken with respect to each depth level (i.e., measure point) in the model. Specifically, the array member G(z,J) is defined as the geometrical factor of the bed J taken with respect to the measure point z. G(z,J) can be calculated for a specified depth level, z, by summing the appropriate weighting factors within the specified bed, J. As an example, consider the bracket 313 (FIG. 12) which is positioned at a measure point depth level of z=9. The geometrical factors for the beds J=1, J=2, and J=3 with respect to this measure point are:

$$G(9,1) = w(9,8) + w(9,9) + w(9,10) + w(9,11) + w(9,12)$$

$$G(9,2) = w(9,13) + w(9,14)$$

$$G(9,3) = w(9,15) + w(9,16)$$

Figure 14:
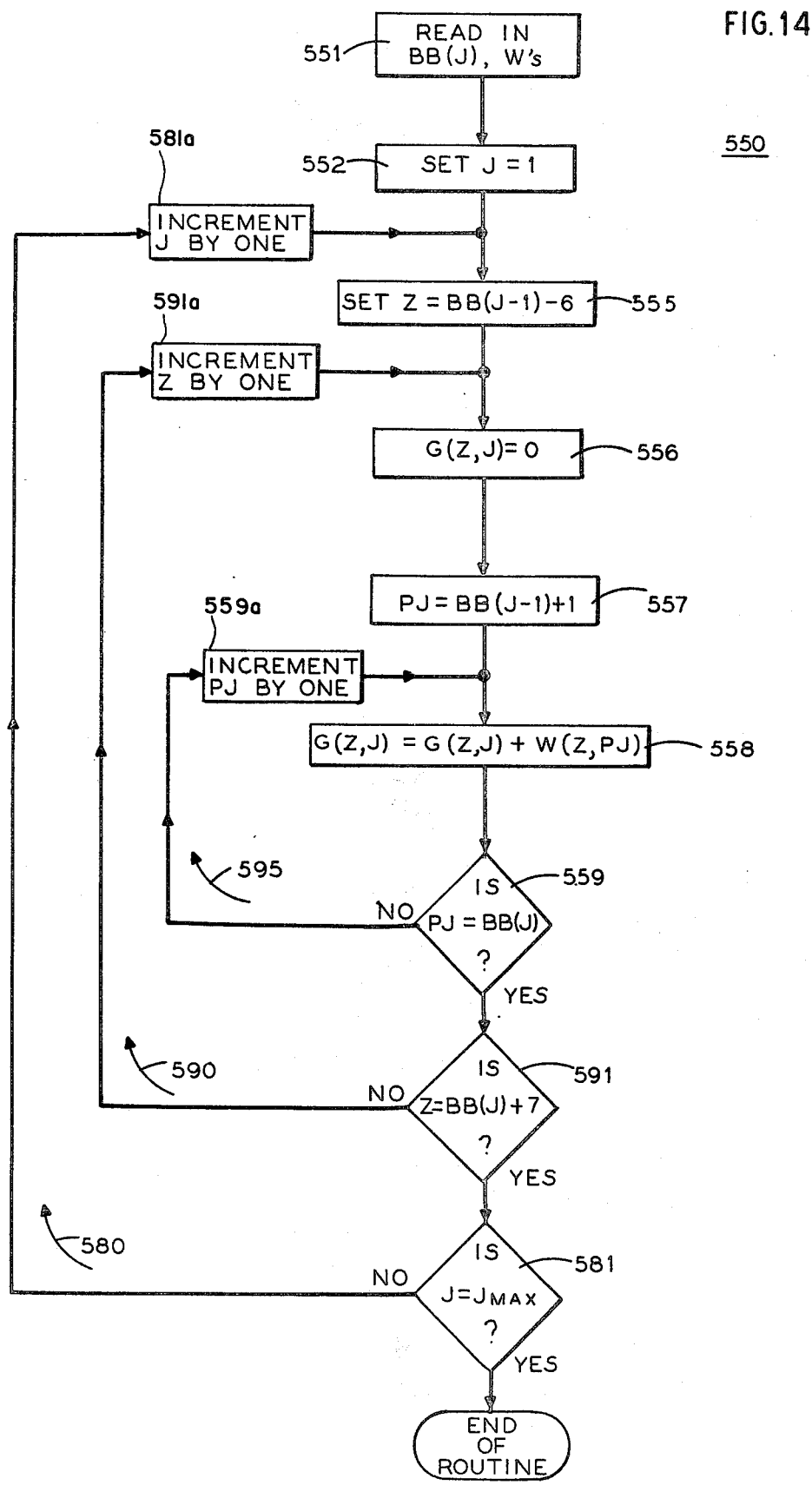
FIG. 14 is another flow diagram for machine programming the computation of array members utilized in generating simulated measurements from a model.

Referring now to FIG. 14, there is shown a flow diagram for machine programming a routine 550 which calculates the geometrical factor matrix members, G(z,J). The block 551 represents the read-in of the bed boundary index numbers, BB(J), and the weighting factors. The bed boundaries may have been previously calculated using a variance technique of the type described or may be selected by other suitable means. The bed index J is set at one (block 552) and z is initialized at a depth level of BB(j-1)−6 (block 555). For any bed J, this value of z is the highest depth level measure point which is affected by the bed J. For example, the bracket 314 is shown at the highest depth level at which the bed J=4 has an effect on a simulated measurement. This depth level is seen to be z=BB(4-1)−6=17−6=11, as it should be. Similarly, the lowest depth level at which a bed J has an effect on a simulated measurement can be shown to be z=BB(J)+7. In each excursion through the large loop 580 a single value of J is considered, and this main loop continues until all beds (25 in this case) have been treated (decision diamond 581 and incrementing block 581a). In the smaller loop 590, each value of z from z=BB(J-1)−6 to z=BB(J)+7 (decision diamond 591 and incrementing block 591a) is considered for the particular value of J being treated. In other words, for each bed J, all measure points which are affected by the bed are considered.

For a given J and z, the value of G(z,J) is initialized at zero (block 556) and an index, designated PJ, is set equal to the highest depth level within the bed J; i.e., PJ=BB(J-1)+1 (block 557). The value of G(z,J) is increased by an amount w(z,PJ) (block 558), PJ is incremented by one depth unit (block 559a), and G(z,J) again increased by w(z,PJ). The small loop 595 continues in this fashion until index PJ reaches the lowest depth level of bed J, viz. BB(J) (diamond 559). At this time the value of G(z,J) has reached $$G(z,J) = \sum_{\text{all } PJ \text{ in bed } J} w(z,PJ)$$

which is the desired geometrical factor value.

Now that the D(z) and G(z,J) matrices have been developed, they can be utilized to generate a set of simulated measurements from a given model. The simulated measurement calculated for a depth level z using a particular model $\hat{\sigma}_n^k$ is designated as $\hat{L}_n^k(z)$. The subscript n and superscript k are utilized to keep track of iteration loops as described hereinafter and are carried along at this time for convenience of later reference. Both n and k can be considered as being at unity for the present. For depth levels in the main portion which are not affected by the end beds, $\hat{L}_n^k(z)$ can be expressed as $$\hat{L}_n^k(z) = \sum_{\text{all } J} G(z,J)\hat{\sigma}_n^k(J) . \quad (6)$$

For depth levels in the main portion which include end-effects, the appropriate expression is:

$$\hat{L}_n^k(z) = \sum_{\text{All } J} G(z,J)\hat{\sigma}_n^k(J) + D(z) \quad (7)$$

Figure 15:
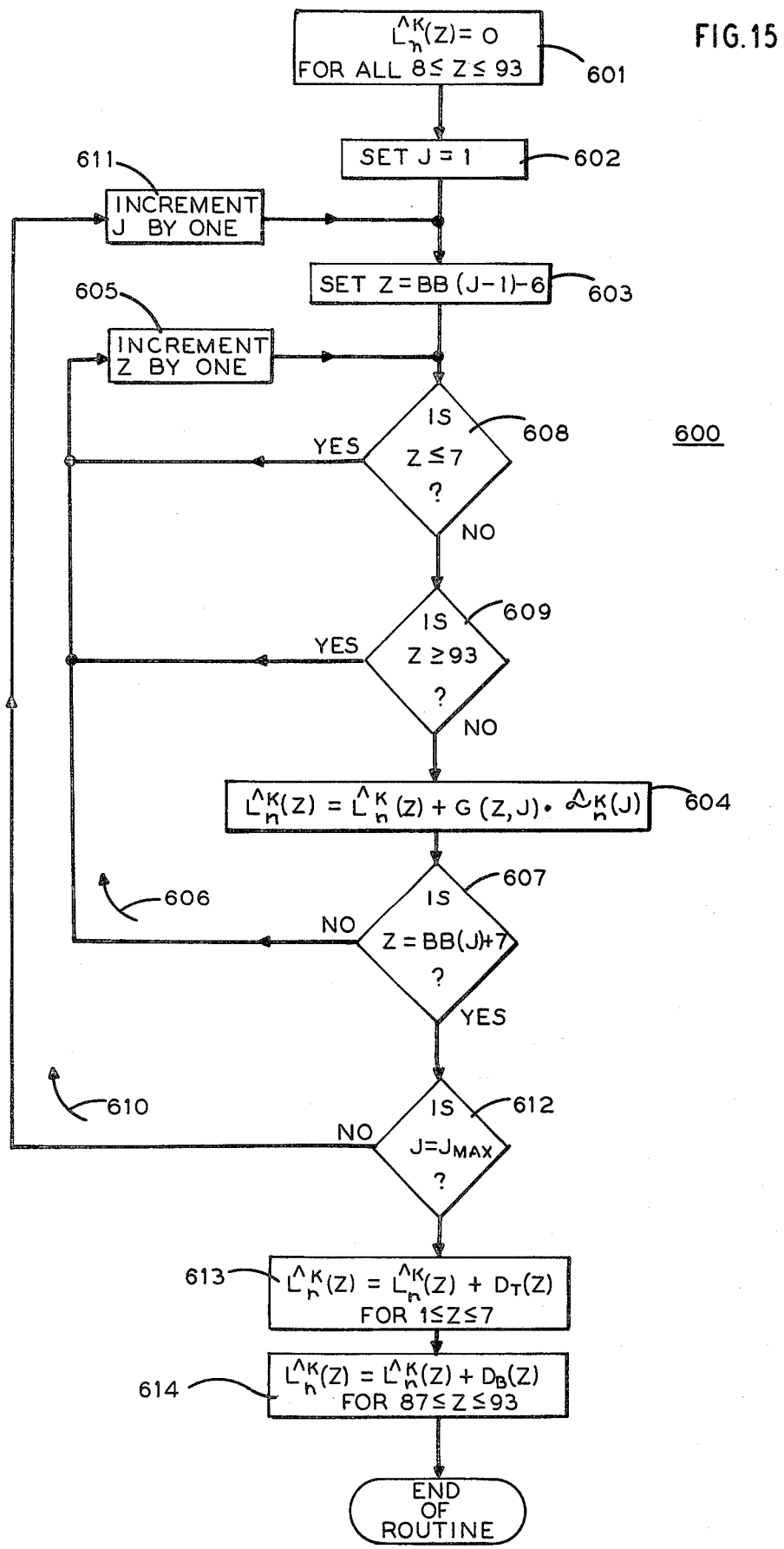
FIG. 15 is a flow diagram for machine programming the generation of simulated measurements from a model.

Referring to FIG. 15, there is shown a flow diagram for machine programming a routine 600 which generates the simulated measurement values $\hat{L}_k^n(z)$ in accordance with the equations (6) and (7). $\hat{L}_k^n(z)$ is initialized at zero for all z in the main portion of the given interval (block 601) and the bed index J is started at J=1 (block 602). The depth level index z is next set equal to the highest depth level affected by the bed under consideration, which was seen above to be z=BB(J-1)−6 (block 603). The value of $\hat{L}_n^k(z)$ is subsequently increased by an amount G(z,J)·$\hat{\sigma}_n^k$(J) (block 604), z is incremented by one (block 605), and the next value of $\hat{L}_n^k(z)$ increased by an amount G(z,J)·$\hat{\sigma}_n^k$(J). The loop 606 continues until all depth level measure points affected by the bed J have been considered (decision diamond 607). The diamonds 608 and 609 prevent depth level measure points in the end beds from being considered. By action of the loop 610 each bed is considered (block 611), one at a time. When all beds have been examined (diamond 612), the relationship is established for all measure point depth levels in the main portion. The blocks 613 and 614 represent the addition of end effects for those depth levels near the end beds which follow equation (7).

Referring again to FIG. 5, there has been described in detail up to this point the method of generating a trial conductivity model (e.g., that represented by curve 202) and of generating a set of simulated measurement values from this model (e.g., curve 205). The simulated measurement values, designated $\hat{L}(z)$ (dropping subscripts and superscripts for the time being) can now be compared to the true measurement values, L(z) (curve 200), to produce an error function ε which reflects the comparison as taken over the main portion of the entire interval. A preferred error function is formed by first generating a set of individual error values in accordance with the relationship $$E(z) = \ln \frac{\hat{L}(z)}{L(z)} \quad (8)$$

and then summing the absolute values of the individual error values to obtain an error function $$\epsilon = |E(z)| = \Sigma \left| \ln\left(\frac{\hat{L}(z)}{L(z)}\right) \right| \tag{9}$$

the summation being taken over all z in the main portion. The comparison of equation (8) is particularly "natural" since, in well logging applications, conductivity measurements are conventionally presented on a logarithmic scale. Other suitable comparisons to form individual error values can be utilized, however, if desired. The error function $\epsilon$ is represented in FIG. 5 by the total area of curve 206 above and below the zero baseline.

As above stated, the objective is to modify the conductivity model in a manner which tends to minimize the error function $\epsilon$. Thus, for example, there would utlimately be generated the model of curve 203 with a corresponding simulated measurement plot of curve 207 and relatively small error function represented by the total area of curve 208 above and below the zero baseline.

Figure 16:
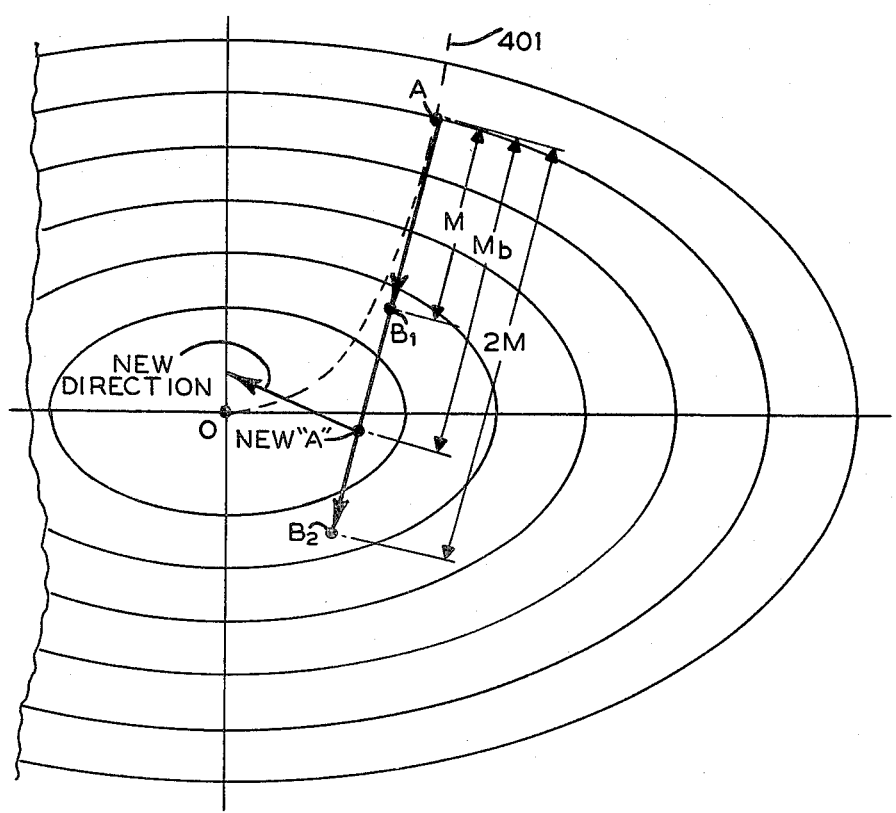
FIG. 16 shows a simplified hypothetical set of error function curves which help illustrate an error minimization technique utilized in an embodiment of the invention.

The approach to error minimization utilized in this embodiment can be illustrated with the aid of FIG. 16, wherein there are shown a set of solid-line curves which represent "equipotentials" of a simple hypothetical error function selected for purposes of illustration. While shown in two dimensions, each error function curve can be thought of as depending on many variables; i.e., as a multidimensional surface on which the error function has a particular value. Assume that the objective task is to start at some point on an error surface and to systematically modify the variables to obtain a set of values for which the error function approaches a small value near the origin "0". A possible method would be to calculate the negative gradient direction of the error function, modify the variables so as to "move" (on the error surface plot) an infinitesimal step in the calculated direction, recalculate the negative gradient and move another infinitesimal step, and so on. By proceeding in this manner, from, say, a point A, a path such as the one illustrated by the dotted curve 401 would be followed, the path being continuously perpendicular to the error surfaces it traverses (as follows from the definition of gradient). Such procedure is not practical, however, as it requires numerous calculations for each small step.

An alternate approach is to calculate the negative gradient direction and to move a finite step in such direction, the size of the step being determined by trial and error. In FIG. 16, for example, assume that the starting point is the point A and that the negative gradient direction is calculated as being in the direction of the overlapping vectors $B_1$ and $B_2$. These vectors have respective magnitudes or "step sizes" of M and 2M. The new value of the error function after each of the steps in the specified direction is calculated and the three error function values (i.e., the values at points A, $B_1$ and $B_2$) are compared. Now, either the best of the trial step sizes (O, M or 2M) for the specified direction is selected, or, an "optimum" step size $M_b$ is determined by interpolation. In either case, the point arrived at after taking the chosen step size becomes the new point A, a new gradient direction is calculated, and another step size chosen after the same trial and error procedure. In this manner, the value of the error function is successively reduced by finite amounts.

The simplified example of FIG. 16 can be applied to the error minimization represented in FIG. 5 by considering the point A (FIG. 16) as being the value of the error function $\epsilon$ calculated for the model of curve 202. The gradient direction of $\epsilon$ is calculated by computing the partial derivative of $\epsilon$ with respect to each bed in the model. The set of partial derivatives define the direction of the gradient of $\epsilon$. As a simplified illustration, consider a model which consists of only three beds $J_D$, $J_E$ and $J_F$ having respective model conductivities of $\hat{\sigma}_D$, $\hat{\sigma}_E$ and $\hat{\sigma}_F$. Assume that the negative partial derivative calculations yield the following values:

$$-\frac{\partial \epsilon}{\partial \hat{\sigma}_D} = 1.0$$

$$-\frac{\partial \epsilon}{\partial \hat{\sigma}_E} = 0.5$$

$$-\frac{\partial \epsilon}{\partial \hat{\sigma}_F} = -1.0$$

The model conductivities can be modified in such a way as to follow the error's negative gradient direction by computing new conductivity values $\sigma'$ in accordance with the relationships $$\left.\begin{array}{l} \hat{\sigma}_D' = \hat{\sigma}_D + (1.0)(M) \\ \hat{\sigma}_E' = \hat{\sigma}_E + (0.5)(M) \\ \hat{\sigma}_F' = \hat{\sigma}_E - (1.0)(M) \end{array}\right\} \tag{9a}$$

where M is a magnitude or "step size" factor as referred to above. The gradient direction of the error function $\epsilon$ is thus seen to be determined by the relative amounts of modification to be applied to the individual beds of the model from which $\epsilon$ was generated. Note that an individual bed conductivity will be either increased or decreased depending on the sign of the partial derivative of $\epsilon$ with respect to the individual bed. In the above example, if M were chosen such that the bed $J_D$ was to be increased by, say, 7 millimho, it is seen that the bed $J_E$ will be increased by 3.5 millimho while the bed $J_F$ will be decreased by 7 millimho.

It has been demonstrated that for certain types of functions, for example quadratic functions, the use of a "conjugate gradient" direction allows convergence to a solution more quickly that the gradient direction. The conjugate gradient direction, when calculated at a given point, takes into account the direction of the previous "step" as well as the newly calculated gradient direction at the given point. If the direction of the step previously taken is designated by the vector B and the newly calculated gradient direction at the given point designated as D, then the conjugate gradient direction at the given point is defined by the vector $$\vec{C}_{conj.} = \vec{D} + h\vec{B} \tag{9b}$$

where h is a constant which determines the "weight" afforded the previous direction. Although the error function to be dealt with herein is not a quadratic function, the technique of tempering the gradient direction based on its past performance has been found useful and is implemented in the present embodiment. For certain types of error functions, it has been found that the use of the conjugate gradient direction avoids the tortuous path of almost-prependicular steps which can arise when using a simple gradient technique.

The partial derivatives necessary for gradient determinations can be developed from equations (6) and (9). For any particular bed, designated the "$Q^{th}$" bed, it follows from equation (6) that $\hat{L}(z)$ can be expressed (again without subscripts and superscripts) as $$\hat{L}(z) = G(z,Q)\hat{\sigma}(Q) + \sum_{\text{all } J \text{ exc. } Q} G(z,J)\hat{\sigma}(J) \tag{10}$$

where, as indicated, the summation is taken over all beds in the main portion of the given interval except the $Q^{th}$ bed which is taken care of by the first term. Substituting the expression of equation (10) in equation (9) we have $$\epsilon = \sum_{\text{All } z} \left| \ln \frac{G(z,Q)\hat{\sigma}(Q)}{L(z)} + \left( \frac{\sum_{\text{All } J \text{ exc. } Q} G(z,J)\hat{\sigma}(J)}{L(z)} \right) \right| \tag{11}$$

Differentiating equation (11) with respect to $\hat{\sigma}(Q)$, keeping in mind that $d(\ln u) = (1/u)du$, gives $$\frac{\partial \epsilon}{\partial \hat{\sigma}(Q)} = \sum_{\text{All } z} [\text{sign of } \hat{L}(z) - L(z)] \tag{12}$$

where the "sign" term and the term $$\frac{L(z)}{\hat{L}(z)}$$

(i.e., the "1/u" portion of 1/u du) are evident from equation (9). From equation (12) it is seen that the individual partial derivative of $\epsilon$ with respect to a particular bed, Q, can be obtained by considering each depth level z at which the simulated measurement is affected by the bed Q, calculating $$\frac{G(z \cdot o)}{\hat{L}(z)}$$

for each z (including a sign when depends on the relative sizes of $\hat{L}(z)$ and $L(z)$), and then summing the results for all z. Note that for z's at which a simulated measurement is not affected by the bed Q, the array value O(z,Q) is zero.

Referring to FIG. 17, there is shown a flow diagram for machine programming a routine 700 which calculates the gradient and conjugate gradient directions utilized in the present embodiment. For convenience, the notations $\delta_n(J)$ and $c_n(J)$ are set up as respectively representing the partial derivatives associated with the gradient and conjugate gradient directions for $n^{th}$ iteration. The bed index J is initialized at one (block 701) and $\delta_n(J)$ and $c_n(J)$ are initialized at zero (blocks 702 and 703). As in the routine 600 (FIG. 15), the depth level index z is next set equal to the highest depth level affected by the bed under consideration, $z = BB(J-1)-6$ (block 704). The value of $\delta_n(J)$ is subsequently decreased by an amount $$F \cdot \frac{G(z,J)}{\hat{L}_n^K(z)}$$

(block 705), where F accounts for the "sign" term of equation (12) and is determined by the action of diamond 706 and blocks 707, 708 and 709. It should be noted that a decrease is appropriate in block 705 since the negative gradient direction is the direction of interest. The depth level index z is successively incremented by one (block 710) and the loop 711 continues until all depth level measure points affected by the J have been considered (diamond 712), at which time $\delta_n(J)$ has achieved the value specified by equation (12). The diamonds 713 and 714 prevent depth level measure points in the end beds from being considered. The iteration index n is then examined to determine if n=1 (diamond 715), and, if so, the conjugate value $c_n(J)$ is set equal to $\delta_n(J)$ (block 716). This is done because for the first iteration there is no past performance by which to "weight" the negative gradient component values. For subsequent iterations or "steps", the block 717 is active and the conjugate value is determined by $$c_n(J) = \delta_n(J) + hc_{n-1}(J)$$

which is consistent with equation (9b) and wherein $c_{n-1}(J)$ represents the direction component of the previous "step." The main loop 718 continues with each value of the bed index J being considered (block 719) until J reaches $J_{max}$ (diamond 720).

Figure 18:
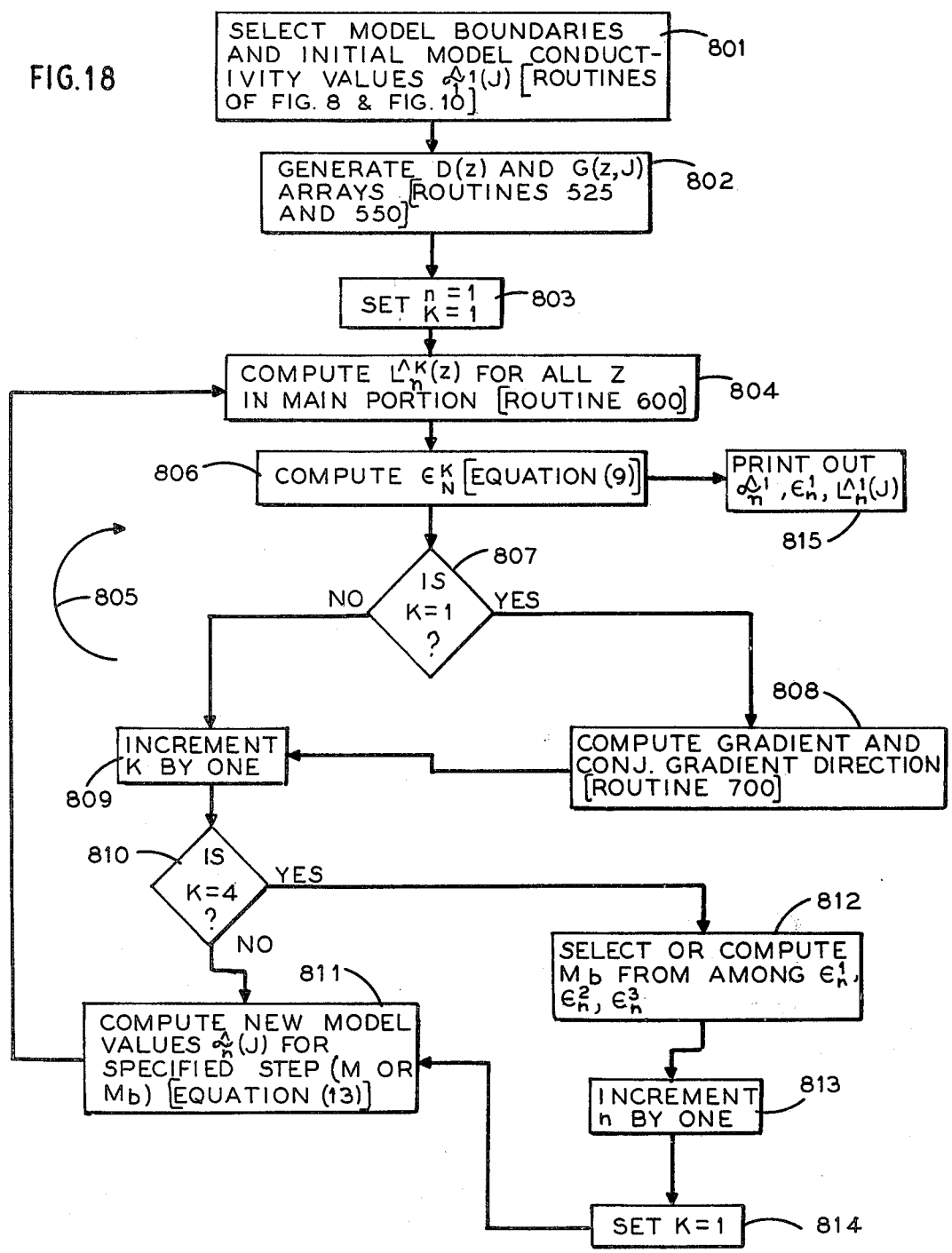
FIG. 18 is a comprehensive block diagram of the method of an embodiment of the invention.

Referring to FIG. 18 there is shown an overall block diagram of the method of the present embodiment which utilizes routines previously developed. The block 801 represents the selection of model boundaries and initial conductivity values for the model beds as set forth in the routines described in conjunction with FIGS. 8 and 10. The block 802 represents the generation of the D(z) and G(z,J) arrays for the particular model as set forth in the routines 525 and 550. Iteration indices n and K are initialized at unity as shown by the block 803. The index n is the "main" iteration counter; i.e., it is used to keep track of the parameters associated with each "decided" change of the subsurface characteristic model. The index K, on the other hand, is used to keep track of "provisional" model changes which occur during the trial-and-error procedure of selecting a "decided" model change.

The block 804 represents the generation of simulated measurement values $\hat{L}_n^K(z)$ which is accomplished by the routine 600. When the main loop 805 is entered for the first time, values of $\hat{L}_1^1(z)$ are generated from the initial model $\hat{\sigma}_1^1(J)$. The error value for the particular model can then be computed in accordance with equation (9). For the initial model the computed error function value is designated $\epsilon_1^1$. The index K is then examined (diamond 807) to determine if K=1, i.e., to determine if "direction" change components $c_n(J)$ have yet been computed for the particular model. If K=1, the $c_n(J)$'s have not yet been computed, block 808 is entered and the components $c_n(J)$ are calculated in accordance with routine 700. The index K is then incremented by one (block 809) and K is examined to determine if K=4 (diamond 810). When K is less than 4, new provisional model values are calculated by action of the block 811 in accordance with the equation $$\hat{\sigma}_n^K(J) = \hat{\sigma}_n^{K-1}(J) + (M) \cdot c_n(J) \tag{13}$$

where it will be recalled from equations (9a) that M is a magnitude or "step size" factor. Thus, for example, for the first excursion through block 811 we would have $$\hat{\sigma}_1^2(J) = \hat{\sigma}_1^1(J) + (M) \cdot c_1(J).$$

Figure 19:
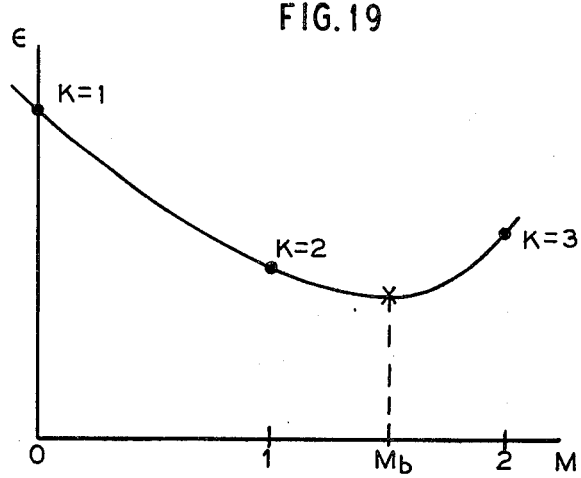
FIG. 19 is a curve which illustrates an interpolation technique that is suitable for use in an embodiment of the invention.

The block 804 is now reentered, simulated measurement values are calculated for the latest provisional model, and then an error function value is calculated for such model (block 806). For the second excursion through these blocks, the values calculated are $\hat{L}_1^2(z)$ and $\epsilon_1^2$. The index K is again incremented (block 809) and the next set of provisional model values is computed in accordance with equation (13) (block 811); i.e., a new provisional model is derived by taking another "step" of magnitude M. After three passes through the loop 805, the operations performed can be reviewed as follows: There have been generated three "provisional" models designated $\hat{\sigma}_1^1$, $\hat{\sigma}_1^2$ and $\hat{\sigma}_1^3$. (Note that the first "provisional" model is the initial trial model.) These three models can be thought of as resulting from respective "step" sizes O, M and 2M in the "direction" of the components $c_1(J)$. The simulated measurement values and error function values associated with the three provisional models are:

step size "$O$" $\rightarrow \hat{\sigma}_1^1 \rightarrow \hat{L}_1^1 \rightarrow \epsilon_1^1$ step size "$M$" $\rightarrow \hat{\sigma}_1^2 \rightarrow \hat{L}_1^2 \rightarrow \epsilon_1^2$ step size "$2M$" $\rightarrow \hat{\sigma}_1^3 \rightarrow \hat{L}_1^3 \rightarrow \epsilon_1^3$ When K is next incremented (block 809) it reaches a value of 4 and the decision diamond 810 directs the programmed method to the block 812 wherein a "best" step size, $M_b$, is determined by examining the error function values associated with the three provisional models. The simplest criterion would be to merely choose from among the available steps, but it is preferred that a suitable interpolation technique be used to find a $M_b$. FIG. 19 illustrates the technique of forming a parabola through the three available points on a plot of $\epsilon$ vs. M. $M_b$ is then selected by interpolation as the value of M at which $\epsilon$ would be approximately a minimum.

Referring again to FIG. 18, after computation of $M_b$, the index n is incremented by one (block 813) and the index K is reset to one (block 814). An "enhanced" model $\hat{\sigma}_1^2$ is then generated (block 811) by computing new model values using a "step" size of $M_b$ in the calculated "direction" from the initial model values. The appropriate equation for each bed conductivity is:

$$\hat{\sigma}_2^1(J) = \hat{\sigma}_1^1 + (M_b)c_1(J). \quad (14)$$

The model $\hat{\sigma}_2^1$ is the result of the first "decided" change in the initial model and is analogous to the "new A" point of FIG. 16. Equation (13) had been utilized in computing "provisional" model values; i.e., it applies when K=2 or K=3. When K is reset to one (and n incremented by one) by the blocks 813 and 814 an equation of the form of equation (14) applies. The general equation for this condition is seen to be $$\hat{\sigma}_n^1(J) = \hat{\sigma}_{n-1}^1(J) + M_b c_{n-1}(J). \quad (14a)$$

During continuation of the programmed method the "enhanced" model $\hat{\sigma}_2^1$ becomes the first of the next set of three "provisional" models $\hat{\sigma}_2^1$, $\hat{\sigma}_2^2$ and $\hat{\sigma}_2^3$ which are generated after calculating new direction components $c_2(J)$ (block 808) and taking "steps" of magnitude M and 2M. During the first "step", the trial magnitude M must be selected without knowledge of previous "step" sizes. For subsequent "steps", however, the previously calculated "optimum" step $M_b$ can be used as a guide for the "trial steps" of the next full iteration, e.g. by setting $M = M_b$.

The model is iteratively enhanced in the manner described for either a predetermined number of iterations, or, until a sampling of the error function indicates a satisfactory result. At such time, a final enhanced model can be printed out (block 815) along with any other computed parameters deemed useful.

The foregoing method of model generation has been described with reference to data processing techniques preferably implemented by the programming of a general purpose digital computer. However, it is to be understood that the method of the present invention could be implemented with other calculating apparatus, for example a special purpose analog or digital computer constructed to perform the described steps. Also, while an induction logging device has been used to illustrate the invented method, it should be again stressed that the invention also applies to other types of subsurface investigation devices.

What is claimed is:

1. A well logging method of producing a representation of the vertical arrangement of subsurface earth formation beds with respect to a subsurface characteristic, which representation is substantially consistent with measurements of the characteristic taken in a well in the formation with a well logging device, comprising:
   (a) deriving a set of initial well logging measurements from the measurements taken in the well with the well logging device over a given depth interval;
   (b) selecting a trial variation of the subsurface characteristic with depth in the well;
   (c) generating, by a computer, a set of new well logging measurements by applying the approximate response characteristic of the logging device to the trial variation of the subsurface characteristic;
   (d) comparing, by a computer, the new well logging measurements to the initial well logging measurements and generating, by a computer, an error function in accordance with said comparison, said error function reflecting the comparison taken over a substantial portion of said given depth interval; and
   (e) modifying, by a computer, the trial variation in a manner which tends to minimize said error function to produce a visual or a stored record of said representation of the vertical arrangement of subsurface beds.

2. A well logging method as in claim 1 wherein the steps (c) through (e) are repeated a desired number of times in iterative fashion, the modified trial variation of step (e) of each iteration being utilized to generate the set of new well logging measurements of step (c) for the next iteration, and including plotting the representation produced as a result of the last iteration.

3. A well logging method as in claim 1 wherein said trial variation is originally selected from the set of initial well logging measurements.

4. A well logging method as in claim 1 wherein said trial variation includes discretely-boundaried beds, the boundaries being based on subsurface characteristic measurements.

5. A well logging method as in claim 4 wherein said subsurface characteristic measurements on which the trial boundaries are based are said initial well logging measurements.

6. A well logging method as in claim 1 wherein the modification of step (e) is determined by trial and error.

7. A well logging method of producing a representation of the arrangement of subsurface earth formation beds with respect to a subsurface characteristic which representation is substantially consistent with measurements of the subsurface characteristic taken in a well in the formation with a well logging device, comprising:
  (a) deriving a set of initial well logging measurements from measurements of said subsurface characteristic taken with the well logging device over a given depth interval;
  (b) selecting a trial variation of the subsurface characteristic with depth in the well;
  (c) generating, by a computer, a set of new well logging measurements by applying the approximate response characteristic of the logging device to the trial variation;
  (d) comparing, by a computer, the new well logging measurements to the initial well logging measurements and generating, by a computer, an error function in accordance with said comparison, said error function reflecting the comparison taken over a substantial portion of said given depth interval;
  (e) determining, by a computer, the gradient direction of said error function; and
  (f) modifying, by a computer, the trial variation in accordance with said gradient direction in a manner which tends to minimize said error function to thereby produce a visual or a stored record of said representation of the arrangement of subsurface beds.

8. A well logging method as in claim 7 wherein the steps (c) through (f) are repeated a desired number of times in iterative fashion, the modified trial variation of step (f) of each iteration being utilized to generate the set of new well logging measurements of step (c) for the next iteration, and including plotting the representation produced as a result of the last iteration.

9. A well logging method as in claim 8 wherein, after the last modification of the trial variation, the conjugate gradient direction of the error function is determined during each performance of step (e), and each modifications of step (f) is performed in accordance with said conjugate gradient direction.

10. A well logging method as in claim 7 wherein the magnitude of the modification of step (f) is determined by trial and error.

11. A well logging method as in claim 10 wherein the steps (c) through (f) are repeated a desired number of times in iterative fashion, the modified trial variation of step (f) of each iteration being utilized to generate the set of new well logging measurements of step (c) for the next iteration.

12. A well logging method of computer generating a representation of the arrangement of subsurface earth formation beds with respect to a subsurface characteristic, which representation is substantially consistent with measurements of the subsurface characteristic taken in a well in the formation with a well logging device, comprising:
  (a) measuring said subsurface characteristic with a well logging device moved through a well in the formation to produce a set of initial well logging measurements over a given depth interval;
  (b) selecting a trial variation of the subsurface characteristic with depth in the well;
  (c) generating a set of new well logging measurements by applying the approximate response characteristic of the logging device to the trial variation;
  (d) comparing the new well logging measurements to the initial well logging measurements and generating an error function in accordance with said comparison, said error function reflecting the comparison taken over a substantial protion of said given depth interval; and
  (e) modifying the trial variation in a manner which tends to minimize said error function to thereby produce a visual or a stored record of said representation of the arrangement of subsurface beds.

13. A well logging method as in claim 12 wherein the steps (c) through (e) are repeated a desired number of times in iterative fashion, the modified trial variation of step (e) of each iteration being utilized to generate the set of new well logging measurements of step (c) for the next iteration, and including plotting the representation produced as a result of the last iteration.

14. A well logging method as in claim 12 wherein said trial variation is originally selected from the set of initial well logging measurements.

15. A well logging method as in claim 12 wherein said trial variation includes discretely-boundaried beds, the boundaries being based on subsurface characteristic measurements.

16. A well logging method as in claim 15 wherein said subsurface characteristic measurements on which the boundaries are based are the initial well logging measurements.

17. A well logging method as in claim 12 wherein the modification of step (e) is determined by trial and error.

18. A well logging method of computer generating a representation of the arrangement of subsurface earth formation beds with respect to a subsurface characteristic, which representation is substantially consistent with measurements of the characteristic taken in a well in the formation with a well logging device, comprising:
  (a) measuring said subsurface characteristic with a well logging device to produce a set of initial well logging measurements over a given depth interval of the well;
  (b) selecting a trial variation of the subsurface characteristic with depth in the well;
  (c) generating a set of new well logging measurements by applying the approximate response characteristic of the logging device to the trial varation;
  (d) comparing the new well logging measurements to the initial well logging measurements and generating an error function in accordance with said comparison, said error function reflecting the comparison taken over a substantial portion of said given depth interval;
  (e) finding the gradient direction of said error function; and
  (f) modifying the trial variation in accordance with said gradient direction in a manner which tends to minimize said error function to thereby produce a visual or a stored record of said representation of the arrangement of subsurface beds.

19. A well logging method as in claim 18 wherein the steps (c) through (f) are repeated a desired number of times in iterative fashion, the modified trial variation of step (f) of each iteration being utilized to generate the set of new well logging measurements of step (c) for the next iteration, and including plotting the representation produced as a result of the last iteration.

20. A well logging method as in claim 19 wherein, after the first modification of the trial variation, the conjugate gradient direction of the error function is found during each performance of step (e) and each modifications of step (f) is performed in accordance with said conjugate gradient direction.

21. A well logging method as in claim 18 wherein the magnitude of the modification of step (f) is determined by trial and error.

22. A well logging method as in claim 21 wherein the steps (c) through (f) are repeated a desired number of times in iterative fashion, the modified trial variation of step (f) of each iteration being utilized to generate the set of new well logging measurements of step (c) for the next iteration.

23. A well logging method of producing a representation of the arrangement of subsurface earth formation beds with respect to a subsurface characteristic, which representation is substantially consistent with measurements of the characteristic taken in a well in the formation with a well logging device, comprising:
(a) deriving a set of initial well logging measurements from the measurements taken with the well logging device over a given depth interval of the well;
(b) selecting a discrete trial variation of the subsurface characteristic with depth in the well;
(c) programming and operating a computer to generate a set of new well logging measurements by applying the approximate response characteristic of the logging device to the trial variation;
(d) programming and operating a computer to compare the new well logging measurements to the initial well logging measurements and to generate an error function in accordance with said comparison, said error function reflecting the comparison taken over a substantial portion of said given depth interval; and
(e) programming and operating a computer to modify the trial variation in a manner which tends to minimize said error function to thereby produce a visual or a stored record of said representation of the arrangement of subsurface beds.

24. A well logging method as in claim 23 wherein the computer is programmed and operated to repeat the steps (c) through (e) a desired number of times in iterative fashion, the modified trial variation of step (e) of each iteration being utilized to genreate the set of new well logging measurements of step (c) for the next iteration.

25. A well logging method as in claim 23 wherein said trial variation is originally selected from the set of initial well logging measurements.

26. A well loggin method as in claim 23 wherein said trial variation includes discretely-boundaried beds, the boundaries being based on subsurface characteristic measurements.

27. A well logging method as in claim 26 wherein said subsurface characteristic measurements on which the bed boundaries are based are the initial well logging measurements.

28. A well logging method as in claim 23 wherein the modification of step (e) is determined by trial and error.

29. A well logging method of producing a representation of the arrangement of subsurface earth formation beds with respect to a subsurface characteristic which representation is substantially consistent with measurements of the characteristic taken in a well in the formation with a well logging device, comprising:
(a) deriving a set of initial well logging measurements from the measurements of the characteristic taken with the well logging device over a given depth interval of the well;
(b) selecting a discrete trial variation of the subsurface characteristic with depth in the well;
(c) programming and operating a computer to generate a set of new well logging measurements by applying the approximate response characteristic of the logging device to the trial variation;
(d) programming and operating a computer to compare the new well logging measurements to the initial well logging measurements and to generate an error function in accordance with said comparison, said error function reflecting the comparison taken over a substantial portion of said given depth interval;
(e) programming and operating a computer to find the gradient direction of said error function; and
(f) programming and operating a computer to modify the trial variation in accordance with said gradient direction in a manner which tends to minimize said error function and to produce a visual or a stored record of thereby said representation of the arrangement of subsurface beds.

30. A well logging method as in claim 29 wherein the computer is programmed and operated to repeat the steps (c) through (f) a desired number of times in iterative fashion, the modified trial variation of step (f) of each iteration being utilized to generate the set of new well logging measurements of step (c) for the next iteration.

31. A well logging method as in claim 30 wherein, after the first modification of the trial variation, the conjugate gradient direction of the error function is found during each performance of step (e), and each modifications of step (f) is performed in accordance with said conjugate gradient direction.

32. A well logging method as in claim 29 wherein the magnitude of the modification of step (f) is determined by trial and error.

33. A well logging method as in claim 32 wherein the computer is programmed and operated to repeat the steps (c) through (f) a desired number of times in iterative fashion, the modified trial variation of step (f) of each iteration being utilized to generate the set of new well logging measurements of step (c) for the next iteration.

34. A method of computer generating a representation of the arrangement of subsurface earth formation beds with respect to subsurface conductivity, which representation is substantially consistent with electrical conductivity readings taken in a well in the formation with an induction logging device, comprising:
(a) deriving a set of initial conductivity well logging measurements from electrical conductivity readings taken over a given depth interval of the well with the induction logging device;

(b) selecting a trial variation of the subsurface conductivity with depth in the well;

(c) generating a set of new conductivity well logging measurements by applying the approximate response characteristic of the induction logging device to the trial variation;

(d) comparing the new conductivity measurements to the initial conductivity measurements and generating an error function in accordance with said comparison, said error function reflecting the comparison taken over a substantial portion of said given depth interval; and (e) modifying the trial variation of conductivity in a manner which tends to minimize said error function to thereby generate a visual or a stored record of said representation of the arrangement of subsurface beds with respect to the electrical conductivity of the subsurface formation.

35. A well logging method as in claim 34 wherein the steps (c) through (e) are repeated a desired number of times in iterative fashion, the modified trial variation of step (e) of each iteration being utilized to generate the set of new conductivity measurements of step (c) for the next iteration.

36. A well logging method as in claim 34 wherein said trial variation is originally selected from the set of initial conductivity measurements.

37. A well logging method as in claim 34 wherein said trial variation includes discretely-boundaried beds, the boundaries being based on subsurface characteristic measurements.

38. A well logging method as in claim 37 wherein said subsurface characteristic measurements on which the trial bed boundaries are based are the initial conductivity measurements.

39. A well logging method as in claim 34 wherein the modification of step (e) is determined by trial and error.

40. A well logging method of computer generating a representation of the arrangement of subsurface earth formation beds with respect to subsurface conductivity, which representation is substantially consistent with electrical conductivity readings taken in a well in the formation with an induction logging device, comprising:

(a) deriving a set of initial conductivity well logging measurements from electrical conductivity readings taken with the induction logging device over a given depth interval of the well;

(b) selecting a trial variation of the subsurface conductivity with depth in the well;

(c) generating a set of new conductivity well logging measurements by applying the approximate response characteristic of the logging device to the trial variation;

(d) comparing the new conductivity measurements to the initial conductivity measurements and generating an error function in accordance with said comparison, said error function reflecting the comparison taken over a substantial protion of said given depth interval;

(e) finding the gradient direction of said error function; and (f) modifying the trial variation in accordance with said gradient direction in a manner which tends to minimize said error function to thereby generate a visual or a stored record of said representation of the arrangement of subsurface beds.

41. A well logging method as in claim 40 wherein the steps (c) through (f) are repeated a desired number of times in iterative fashion, the modified trial variation of step (f) of each iteration being utilized to genreate the set of new conductivity measurements of step (c) for the next iteration.

42. A well logging method as in claim 41 wherein, after the first modification of the trial variation, the conjugate gradient direction of the error function is found during each performance of step (e), and each modifications of step (f) is performed in accordance with said conjugate gradient direction.

43. A well logging method as in claim 40 wherein the magnitude of the modification of step (f) is determined by trial and error.

44. A well logging method as in claim 43 wherein the steps (c) through (f) are repeated a desired number of times in iterative fashion, the modified trial variation of step (f) of each iteration being utilized to genreate the set of new conductivity measurements of step (c) for the next iteration.

45. Apparatus for producing a representation of the arrangement of subsurface earth formation beds with respect to a subsurface characteristic which representation is substantially consistent with measurements of the characteristic taken in a well in the formation with a well logging device, comprising:

A. means for:
  (a) deriving a set of initial well logging measurements from measurements of the characteristic taken with the well logging device over a given depth interval of the well;
  (b) selecting a trial variation of the subsurface characteristic with depth in the well;
  (c) generating a set of new well logging measurements by applying the approximate response characterstic of the logging device to the trial variation;
  (d) comparing the new well logging measurements to the initial well logging measurements and generating an error function in accordance with said comparison, said error function reflecting the comparison taken over a substantial portion of said given depth interval; and
  (e) modifying the trial variation in a manner which tends to minimize said error function to thereby produce a visual or a stored record of said representation of the arrangement of subsurface beds; and B. means for retaining, at least temporarily, a tangible form of said representation of the arrangement of subsurface beds.

46. A method of exploring a subsurface earth formation conprising:

(a) producing initial well logging measurements derived from a well logging device passed over a given depth interval through a well in the subsurface earth formation and operated to take said initial measurements of a characteristic of the earth formation adjacent the well at selected depths in the well, said logging device having a selected approximate response characteristic;

(b) producing a selected trial variation, with depth in the well, of the characteristic of the subsurface earth formation;

(c) generating new well logging measurements for said depths in the well, by applying the approximate response characteristic of the well logging device to said selected trial variation of the characteristic;
(d) comparing the new and initial well logging measurements at respective depths in the well, and generating, on the basis of the comparison, an error function reflecting the comparison over a substantial portion of the given depth interval;
(e) modifying the selected trial variation in accordance with the error function generated on the basis of the comparison between the new and initial measurements to produce a new selected trial variation capable of yielding further new well logging measurements, conforming more closely to the initial well logging measurements, when the response characteristic of the well logging device is applied to the new selected trial variation; and
(f) plotting the new selected trial variation of the measured characteristic of the earth formation versus depth in the well to thereby produce a plot of the arrangement of subsurface earth formation beds with respect to said characteristic of the subsurface formation.

* * * * *